(12) United States Patent
Chen et al.

(10) Patent No.: US 12,055,845 B2
(45) Date of Patent: Aug. 6, 2024

(54) PROJECTION SCREEN AND PROJECTION APPARATUS

(71) Applicant: Hisense Laser Display Co., Ltd, Qingdao (CN)

(72) Inventors: Youcai Chen, Qingdao (CN); Changming Yang, Qingdao (CN)

(73) Assignee: HISENSE LASER DISPLAY CO., LTD, Qingdao (CN)

( * ) Notice: Subject to any disclaimer, the term of this patent is extended or adjusted under 35 U.S.C. 154(b) by 113 days.

(21) Appl. No.: 17/827,632

(22) Filed: May 27, 2022

(65) Prior Publication Data

US 2022/0291578 A1 Sep. 15, 2022

Related U.S. Application Data

(63) Continuation of application No. PCT/CN2021/089271, filed on Apr. 23, 2021.

(30) Foreign Application Priority Data

Apr. 26, 2020 (CN) .......................... 202010339953.6
Apr. 9, 2021 (CN) .......................... 202110383578.X

(51) Int. Cl.
*G03B 21/58* (2014.01)
*G03B 21/56* (2006.01)
(Continued)

(52) U.S. Cl.
CPC ............. *G03B 21/58* (2013.01); *G03B 21/56* (2013.01); *G03B 21/60* (2013.01); *G06F 1/1601* (2013.01); *H04M 1/0268* (2013.01)

(58) Field of Classification Search
CPC ........ G03B 21/58; G03B 21/56; G03B 21/60; H04M 1/0268; G06F 1/1601
(Continued)

(56) References Cited

U.S. PATENT DOCUMENTS

2007/0183032 A1* 8/2007 Michimori ............. G03B 21/28
359/443
2008/0016650 A1* 1/2008 Moon ..................... F16M 11/18
16/334
(Continued)

FOREIGN PATENT DOCUMENTS

CN 205679914 U 11/2016
CN 109870875 A * 6/2019
(Continued)

OTHER PUBLICATIONS

International Search Report and Written Opinion issued in corresponding International Patent Application No. PCT/CN2021/089271 dated Jul. 29, 2021, with English translation.
(Continued)

*Primary Examiner* — Stephanie E Bloss
*Assistant Examiner* — Kevin C Butler
(74) *Attorney, Agent, or Firm* — Morgan, Lewis & Bockius LLP

(57) ABSTRACT

A projection screen and a projection apparatus are provided. The projection screen includes a base, a rolling mechanism, a lifting mechanism, an optical curtain and a tensioning mechanism. The rolling mechanism is disposed on the base. A first end of the lifting mechanism is fixedly connected to the base. A first end of the optical curtain is fixedly connected to the rolling mechanism, and a second end of the optical curtain is fixedly connected to a second end of the lifting mechanism. A tensioning mechanism is fixedly connected to the rolling mechanism and the second end of the lifting mechanism. The lifting mechanism is located between the optical curtain and the tensioning mechanism. The projection apparatus includes the above projection screen and an optical engine.

15 Claims, 21 Drawing Sheets

(51) Int. Cl.
*G03B 21/60* (2014.01)
*G06F 1/16* (2006.01)
*H04M 1/02* (2006.01)

(58) Field of Classification Search
USPC .......................................................... 359/461
See application file for complete search history.

(56) References Cited

U.S. PATENT DOCUMENTS

| | | | | |
|---|---|---|---|---|
| 2014/0307234 | A1* | 10/2014 | Okura | G03B 21/145 |
| | | | | 353/119 |
| 2022/0291578 | A1* | 9/2022 | Chen | G03B 21/58 |

FOREIGN PATENT DOCUMENTS

| | | | | | |
|---|---|---|---|---|---|
| CN | 109870875 | A | | 6/2019 | |
| CN | 110133955 | A | | 8/2019 | |
| CN | 110133955 | A | * | 8/2019 | |
| CN | 209514294 | U | * | 10/2019 | |
| CN | 209514294 | U | | 10/2019 | |
| CN | 110467061 | A | | 11/2019 | |
| CN | 110572629 | A | | 12/2019 | |
| CN | 110647003 | A | | 1/2020 | |
| CN | 110647003 | A | * | 1/2020 | |
| CN | 110658673 | A | | 1/2020 | |
| CN | 110946418 | A | | 4/2020 | |
| CN | 212675353 | U | * | 3/2021 | |
| CN | 110946418 | B | * | 8/2021 | A47B 81/06 |
| CN | 110572629 | B | * | 9/2021 | G03B 21/58 |
| CN | 113568266 | A | * | 10/2021 | G03B 21/58 |
| CN | 113641070 | A | | 11/2021 | |
| CN | 113641071 | A | | 11/2021 | |
| CN | 113641072 | A | | 11/2021 | |
| CN | 113641073 | A | * | 11/2021 | |
| CN | 113641073 | A | | 11/2021 | |
| CN | 113885290 | A | * | 1/2022 | |
| CN | 113946094 | A | * | 1/2022 | |
| CN | 115427886 | A | | 12/2022 | |
| CN | 115877648 | A | | 3/2023 | |
| GB | 496211 | A | * | 11/1938 | G03B 21/58 |
| GB | 496211 | A | | 11/1938 | |
| JP | 2008-286981 | A | | 11/2008 | |
| JP | 2008286981 | A | * | 11/2008 | |
| JP | 4667345 | B2 | * | 4/2011 | G03B 21/10 |
| JP | 2014206567 | A | * | 10/2014 | G03B 21/10 |
| WO | WO-2022258064 | A1 | * | 12/2022 | |

OTHER PUBLICATIONS

Office Action issued in corresponding Chinese Patent Application No. 202110383578.X dated Feb. 15, 2022, with English abstract.
Office Action issued on Dec. 27, 2023 in Chinese Patent Application No. 2022108108979 with English translation.
Office Action issued on Jan. 4, 2024 in Chinese Patent Application No. 202210810896.4 with English translation.

* cited by examiner

PROJECTION SCREEN AND PROJECTION APPARATUS

CROSS-REFERENCE TO RELATED APPLICATIONS

This application is a continuation application of International Application No. PCT/CN2021/089271, filed on Apr. 23, 2021, which claims priorities to Chinese Patent Application No. 202110383578.X, filed on Apr. 9, 2021, and Chinese Patent Application No. 202010339953.6, filed on Apr. 26, 2020, which are incorporated herein by reference in their entireties.

TECHNICAL FIELD

The present disclosure relates to the field of projection display technologies, and in particular, to a projection screen and a projection apparatus.

BACKGROUND

With the continuous development of science and technology, projection devices are increasingly applied in people's work and life. At present, a projection device mainly includes an optical engine and a projection screen. A light outlet of the optical engine faces the projection screen, so as to emit light beams to the projection screen. The projection screen is configured to receive the light beams and display an image.

SUMMARY

In an aspect, a projection screen is provided. The projection screen includes a base, a rolling mechanism, a lifting mechanism, an optical curtain and a tensioning mechanism. The rolling mechanism is disposed on the base. A first end of the lifting mechanism is fixedly connected to the base. A first end of the optical curtain is fixedly connected to the rolling mechanism, and a second end of the optical curtain is fixedly connected to a second end of the lifting mechanism. The tensioning mechanism is fixedly connected to the rolling mechanism and the second end of the lifting mechanism. The lifting mechanism is located between the optical curtain and the tensioning mechanism.

In another aspect, a projection apparatus is provided. The projection apparatus includes the above projection screen and an optical engine. The projection screen is configured to display a projection image. The optical engine is configured to emit light beams to the projection screen.

BRIEF DESCRIPTION OF THE DRAWINGS

In order to describe technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art may obtain other drawings according to these drawings. In addition, the accompanying drawings in the following description may be regarded as schematic diagrams, and are not limitations on actual size of products, actual processes of methods and actual timings of signals to which the embodiments of the present disclosure relate.

DETAILED DESCRIPTION

Figure 1A:
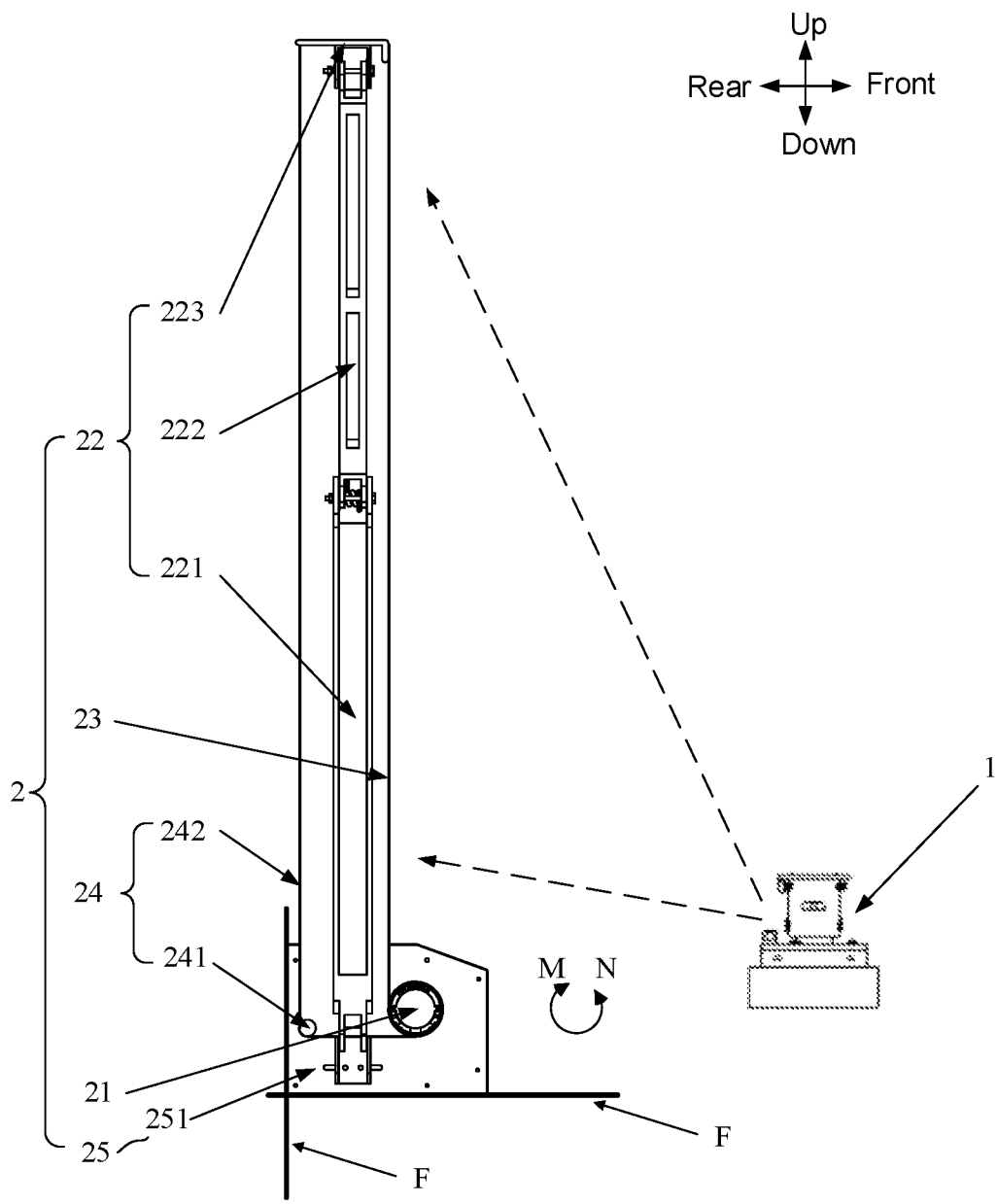
FIG. 1A is a side view of a projection apparatus, in accordance with some embodiments.

Technical solutions in some embodiments of the present disclosure will be described clearly and completely with reference to the accompanying drawings below. However, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to". In the description, the terms such as "one embodiment", "some embodiments", "exemplary embodiments", "example", "specific example" or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics described herein may be included in any one or more embodiments or examples in any suitable manner.

Hereinafter, the terms "first" and "second" are only used for descriptive purposes, and cannot be construed as indicating or implying the relative importance or implicitly indicating the number of indicated technical features. Therefore, the features defined with "first" and "second" may explicitly or implicitly include one or more of these features. In the description of the embodiments of the present disclosure, the term "a plurality of" means two or more unless otherwise specified.

In the description of some embodiments, the term "coupled" and "connected" and their derivatives may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The use of the phrase "applicable to" or "configured to" herein means an open and inclusive language, which does not exclude devices that are applicable to or configured to perform additional tasks or steps.

In addition, the phrase "based on" used herein has an open and inclusive meaning, since a process, step, calculation or other action that is "based on" one or more of the stated conditions or values may, in practice, be based on additional conditions or values exceeding those stated.

The term "about", "substantially" or "approximately" as used herein includes a stated value and an average value within an acceptable range of deviation of a particular value. The acceptable range of deviation is determined by a person of ordinary skill in the art, considering measurement in question and errors associated with measurement of a particular quantity (i.e., limitations of a measurement system).

The term such as "parallel", "perpendicular" or "equal" as used herein includes a stated condition and a condition similar to the stated condition. A range of the similar condition is within an acceptable deviation range, and the acceptable deviation range is determined by a person of ordinary skill in the art, considering measurement in question and errors associated with measurement of a particular quantity (i.e., limitations of a measurement system). For example, the term "parallel" includes absolute parallelism and approximate parallelism, and an acceptable deviation range of the approximate parallelism may be, for example, a deviation within 5°. The term "perpendicular" includes absolute perpendicularity and approximate perpendicularity, and an acceptable deviation range of the approximate perpendicularity may also be, for example, a deviation within 5°. The term "equal" includes absolute equality and approximate equality, and an acceptable deviation range of the approximate equality may be that, for example, a difference between the two that are equal is less than or equal to 5% of either of the two.

Generally, a projection apparatus includes a projection screen and an optical engine. The projection screen includes an optical curtain and a structure supporting the optical curtain. Due to an instability of the structure supporting the optical curtain, the projection screen is easily tilted forward or backward, which results in the projection screen cannot normally receive light beams emitted by the optical engine, thereby causing problems such as distortion or blur in a displayed image. FIG. 1A is a side view of a projection apparatus, in accordance with some embodiments. As shown in FIG. 1A, the projection apparatus 1000 includes an optical engine 1 and a projection screen 2. The optical engine 1 is configured to emit the light beams to the projection screen 2.

In some embodiments, the optical engine 1 is an ultra-short-focus optical engine. Of course, the optical engine 1 may also be a short-focus optical engine or a long-focus optical engine.

Figure 2:
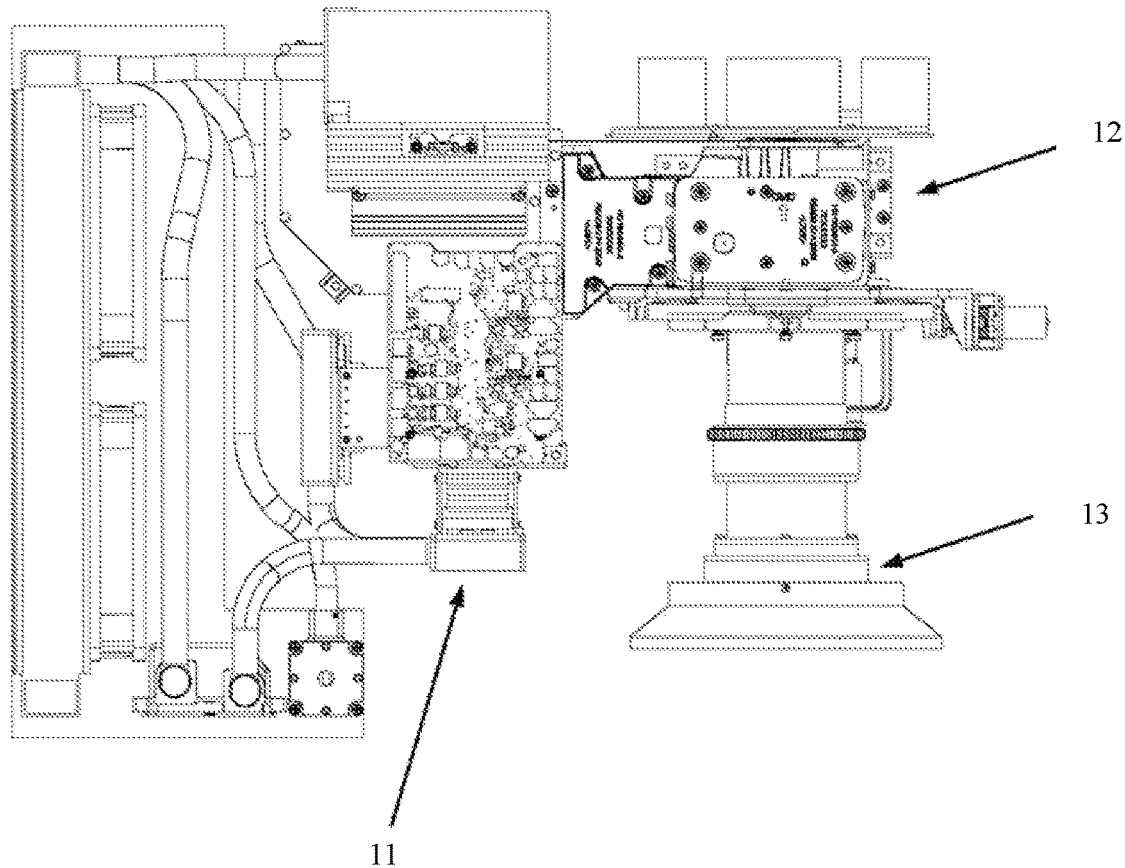
FIG. 2 is a diagram showing a structure of an optical engine, in accordance with some embodiments.

FIG. 2 is a diagram showing a structure of an optical engine, in accordance with some embodiments.

As shown in FIG. 2, the optical engine 1 includes a light source 11, an optical engine system 12 and a lens 13. The light source 11 and the lens 13 are fixedly connected to the optical engine system 12. The optical engine system 12 includes a digital micromirror device (DMD) chip and a control circuit board. The DMD chip is disposed in the optical engine system 12, and the DMD chip is electrically connected to the control circuit board.

In this way, the light source 11 emits the light beams to the DMD chip in the optical engine system 12. The control circuit board controls the DMD chip to modulate the light beams emitted to the DMD chip, and the modulated light beams are emitted to the lens 13, and in turn, the light beams are emitted to the projection screen 2 through the lens 13 to achieve displaying of an image.

In some embodiments, as shown in FIG. 1A, the projection screen 2 includes a base 25, a rolling mechanism 21, a lifting mechanism 22, an optical curtain 23 and a tensioning mechanism 24. The tensioning mechanism 24 includes an auxiliary roller 241 and a tensioning assembly 242, and the auxiliary roller 241 is pressed on the tensioning assembly 242.

A first end of the optical curtain 23 and a first end of the tensioning assembly 242 are fixedly connected to the rolling mechanism 21. A first end of the lifting mechanism 22 is fixedly connected to the base 25. A second end of the optical curtain 23 and a second end of the tensioning assembly 242 are fixedly connected to a second end of the lifting mechanism 22, and the lifting mechanism 22 is located between the optical curtain 23 and the tensioning assembly 242. The rolling mechanism 21 and the lifting mechanism 22 may control the unfolding and folding of the optical curtain 23.

In a case where the optical curtain 23 is unfolded, the light beams emitted by the optical engine 1 are reflected, so as to display the image. In a case where the tensioning assembly 242 is unfolded, the second end of the lifting mechanism 22 is tensioned by the tensioning assembly 242.

Herein, the first end of the optical curtain 23, the first end of the tensioning assembly 242 and the first end of the lifting mechanism 22 may refer to a lower end thereof in FIG. 1A, and the second end of the optical curtain 23, the second end of the tensioning assembly 242 and the second end of the lifting mechanism 22 may refer to an upper end thereof in FIG. 1A.

In some embodiments, in a case where the optical curtain 23 and the tensioning assembly 242 are in an unfolded state, since the lifting mechanism 22 is located between the optical curtain 23 and the tensioning assembly 242, a tension of the tensioning assembly 242 on the second end of the lifting mechanism 22 may be balanced with a tension of the optical curtain 23 on the second end of the lifting mechanism 22. In this way, the tensioning assembly 242 may limit a pitch angle of the optical curtain 23 and correct the pitch angle of the optical curtain 23, so that problems such as distortion or blur of the image displayed on the optical curtain 23 may be avoided, and in turn, the display effect of the projection screen 2 is improved.

It will be noted that, the pitch angle of the optical curtain 23 may be an angle between a plane where the optical curtain 23 is located and a plumb line.

The rolling mechanism 21 is disposed on the base 25, and the rolling mechanism 21 is located at a side of the lifting mechanism 22 proximate to the optical curtain 23. The rolling mechanism 21 may synchronously tension the optical curtain 23 and the tensioning assembly 242, so as to limit the pitch angle of the optical curtain 23 through the tensioning assembly 242.

Figure 18:
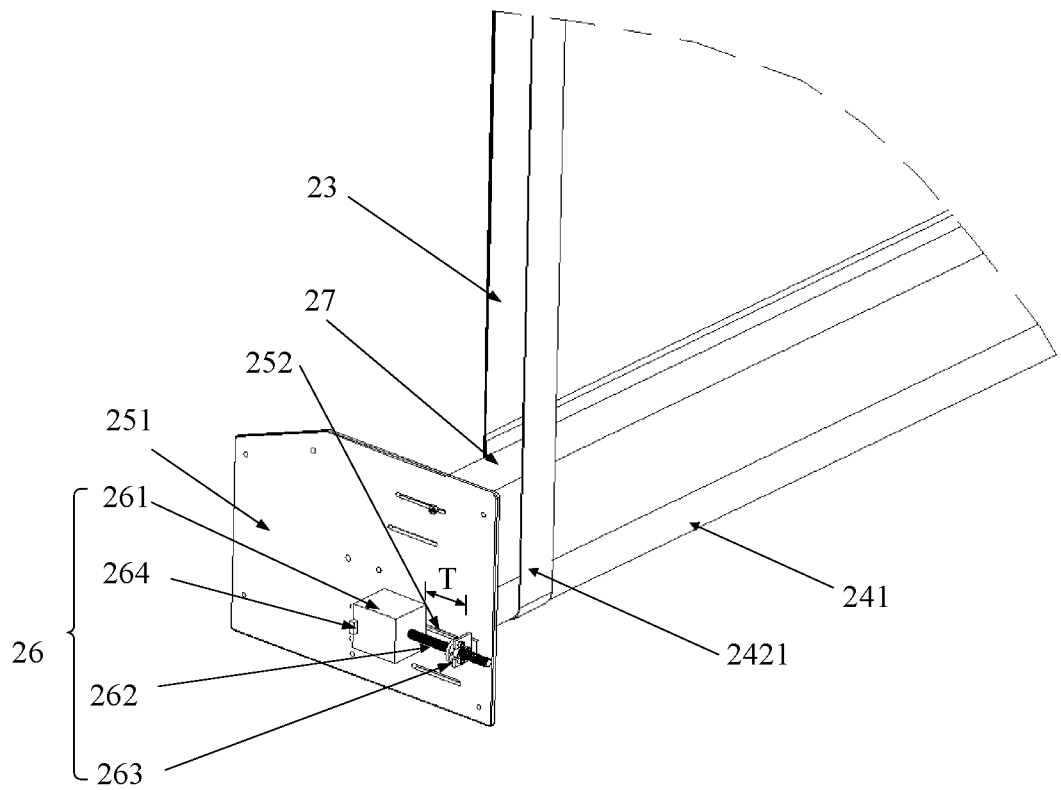
FIG. 18 is a diagram showing a structure of a control mechanism, in accordance with some embodiments.

The projection apparatus 1000 has a folded state and an unfolded state. In a case where the projection apparatus 1000 is not in use, a height of the second end of the lifting mechanism 22 is lowered through a control mechanism 26 (as shown in FIG. 18), so that the optical curtain 23 and the tensioning assembly 242 are wrapped on the rolling mechanism 21. In this case, the projection apparatus 1000 is in the folded state, and the space occupied by the projection screen 2 is reduced. In a case where the projection apparatus 1000 needs to be used, the height of the second end of the lifting mechanism 22 is raised through the control mechanism 26, so that the optical curtain 23 and the tensioning assembly 242 are unfolded synchronously, the projection apparatus 1000 is in the unfolded state. In this way, it is convenient for the optical curtain 23 to reflect the light beams emitted by the optical engine 1 and display the image.

In some embodiments, as shown in FIG. 1A, the base 25 is fixedly connected to an installation surface F, so as to achieve fixing of the projection screen 2. The installation surface F may be a support surface of a fixed bracket, a surface of a wall, or the ground, as long as fixed support for the projection screen 2 may be achieved.

As shown in FIG. 1A, the lifting mechanism 22 includes a first supporting rod 221 and a second supporting rod 222.

A first end of the first supporting rod 221 is connected to the base 25, a second end of the first supporting rod 221 is connected to a first end of the second supporting rod 222, and a second end of the second supporting rod 222 is connected to the optical curtain 23. The first end of the first supporting rod 221 and the base 25, the second end of the first supporting rod 221 and the first end of the second supporting rod 222, and the second end of the second supporting rod 222 and the optical curtain 23 are all rotatable connected (e.g., hinged).

Figure 5:
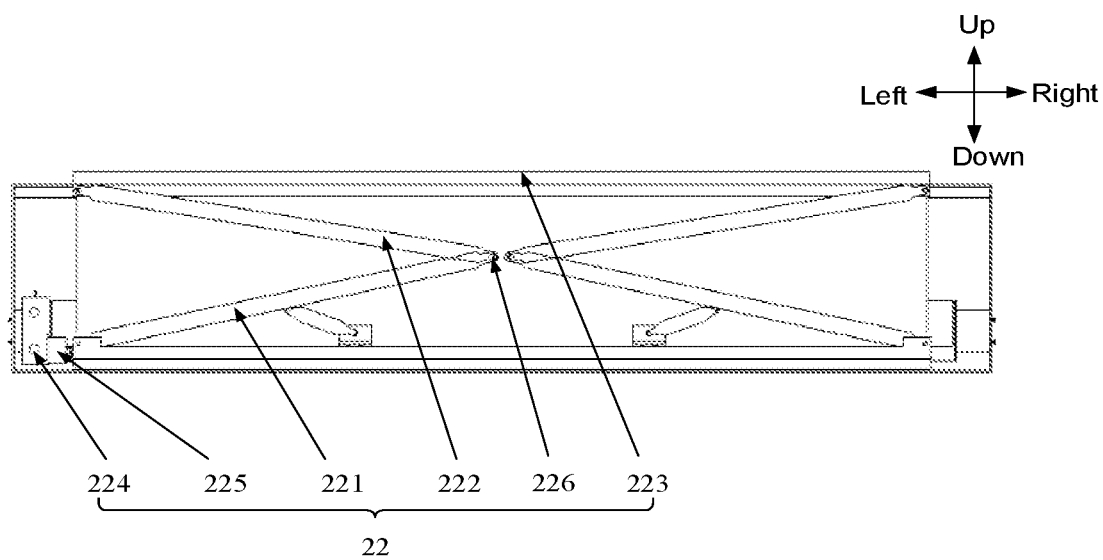
FIG. 5 is a diagram showing a structure of a lifting mechanism, in accordance with some embodiments.

In some embodiments, the projection screen 2 includes a plurality of groups (e.g., two groups are shown in FIG. 5) of lifting mechanisms 22. Each group of lifting mechanism 22 includes a first supporting rod 221 and a second supporting rod 222, and folding and unfolding of the optical curtain 23 may be well controlled through the plurality of groups of lifting mechanisms 22.

Figure 3:
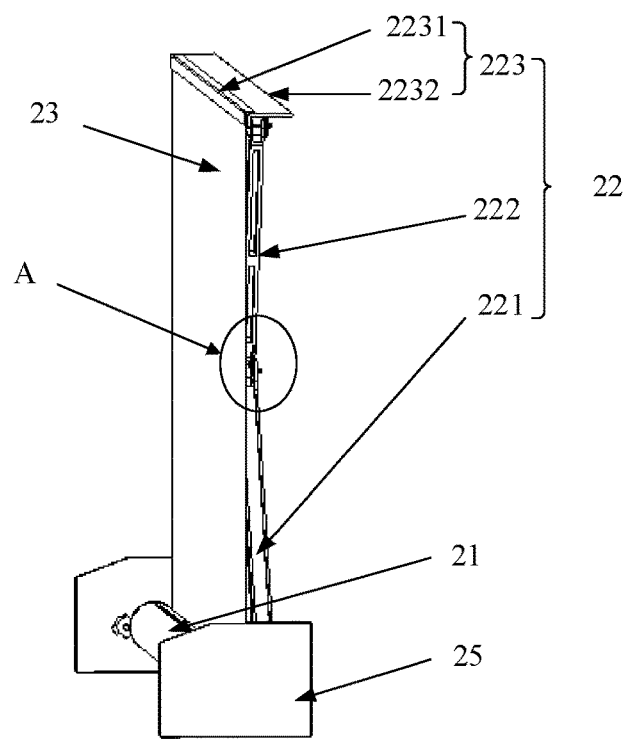
FIG. 3 is a perspective view of a projection screen, in accordance with some embodiments.
Figure 4:
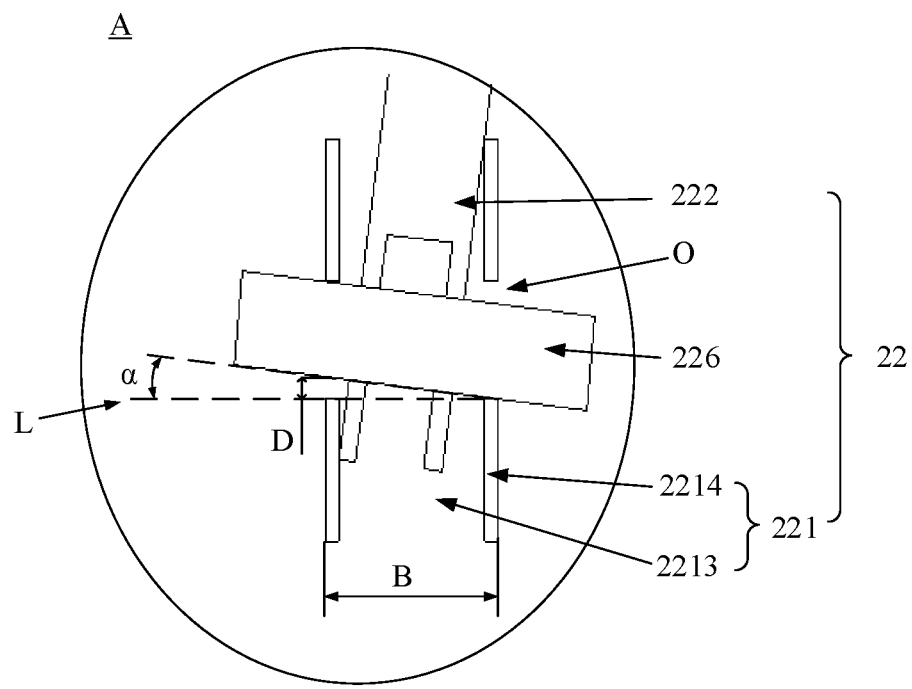
FIG. 4 is a partial enlarged view of circle A in FIG. 3.

FIG. 3 is a perspective view of a projection screen, in accordance with some embodiments. FIG. 4 is a partial enlarged view of circle A in FIG. 3.

As shown in FIG. 3 and FIG. 4, each group of lifting mechanism 22 further includes a first connecting shaft 226. The first supporting rod 221 includes a first connecting groove 2213, and the first connecting groove 2213 is located at the second end of the first supporting rod 221. The first end of the second supporting rod 222 extends into the first connecting groove 2213. The second end of the first supporting rod 221 and the first end of the second supporting rod 222 may be rotatably connected through the first connecting shaft 226. Two groove walls 2214 of the first connecting groove 2213 and side walls of the first end of the second supporting rod 222 each is provided with a connecting hole O. The first connecting shaft 226 passes through the connecting holes O on the two groove walls and the connecting holes O on the second supporting rod 222, so as to achieve a rotatable connection between the first supporting rod 221 and the second supporting rod 222.

Generally, a gap D is provided between inner walls of the connecting holes O on the groove walls 2214 and the first connecting shaft 226. For example, the gap between the hole walls of the connecting holes O on the groove walls 2214 and the first connecting shaft 226 is less than or equal to 0.2 mm. In this way, the second supporting rod 222 is easy to tilt due to an external force, resulting in a change of a positional relationship between the second end of the first supporting rod 221 and the first end of the second supporting rod 222, so that a straight line L, which is parallel to a straight line where center points of the two connecting holes O on the two groove walls 2214 are located, has an included angle with an axial direction of the first connecting shaft 226. Furthermore, after the second supporting rod 222 is tilted, the optical curtain 23 is caused to tilt forward or backward.

In some embodiments, an inclination angle of the second supporting rod 222 is equal to an included angle between the straight line where the center points of the two connecting holes O on the two groove walls 2214 are located and the axial direction of the first connecting shaft 226. A maximum included angle between the straight line where the center points of the two connecting holes O on the two groove walls 2214 and the axial direction of the first connecting shaft 226 may be calculated according to the following formula:

$$\alpha = \tan^{-1}(D/B) = \arctan(D/B).$$

In the above formula, α is the maximum included angle between the straight line where the center points of the two connecting holes on the two groove walls 2214 are located and the axial direction of the first connecting shaft 226, D is a maximum gap between the inner walls of the connecting holes on the two groove walls 2214 and an outer wall of the first connecting shaft 226, and B is a distance between the two groove walls 2214 of the first connecting groove 2213.

The lifting mechanism 22 further includes a beam 223, and the beam 223 includes a first side 2231 and a second side 2232. The first side 2231 of the beam 223 is located at a side of the optical curtain 23, and the second side 2232 of the beam 223 is located at a side of the tensioning assembly 242.

In some embodiments, as shown in FIG. 3, the beam 223 is in a shape of a thin plate. The second end of the second supporting rod 222 is rotatably connected to the beam 223, and the second end of the optical curtain 23 is fixedly connected to the beam 223. For example, the second end of the optical curtain 23 is fixedly connected to the first side 2231 of the beam 223, the second end of the tensioning assembly 242 is fixedly connected to the second side 2232 of the beam 223, and the optical curtain 23 and the tensioning assembly 242 are located on two opposite sides of the second supporting rod 222 (referring to FIG. 1A). In this way, the tensioning assembly 242 balances a tension of the optical curtain 23 on the beam 223 by tensioning the beam 223, so as to limit the pitch angle of the optical curtain 23.

Figure 1B:
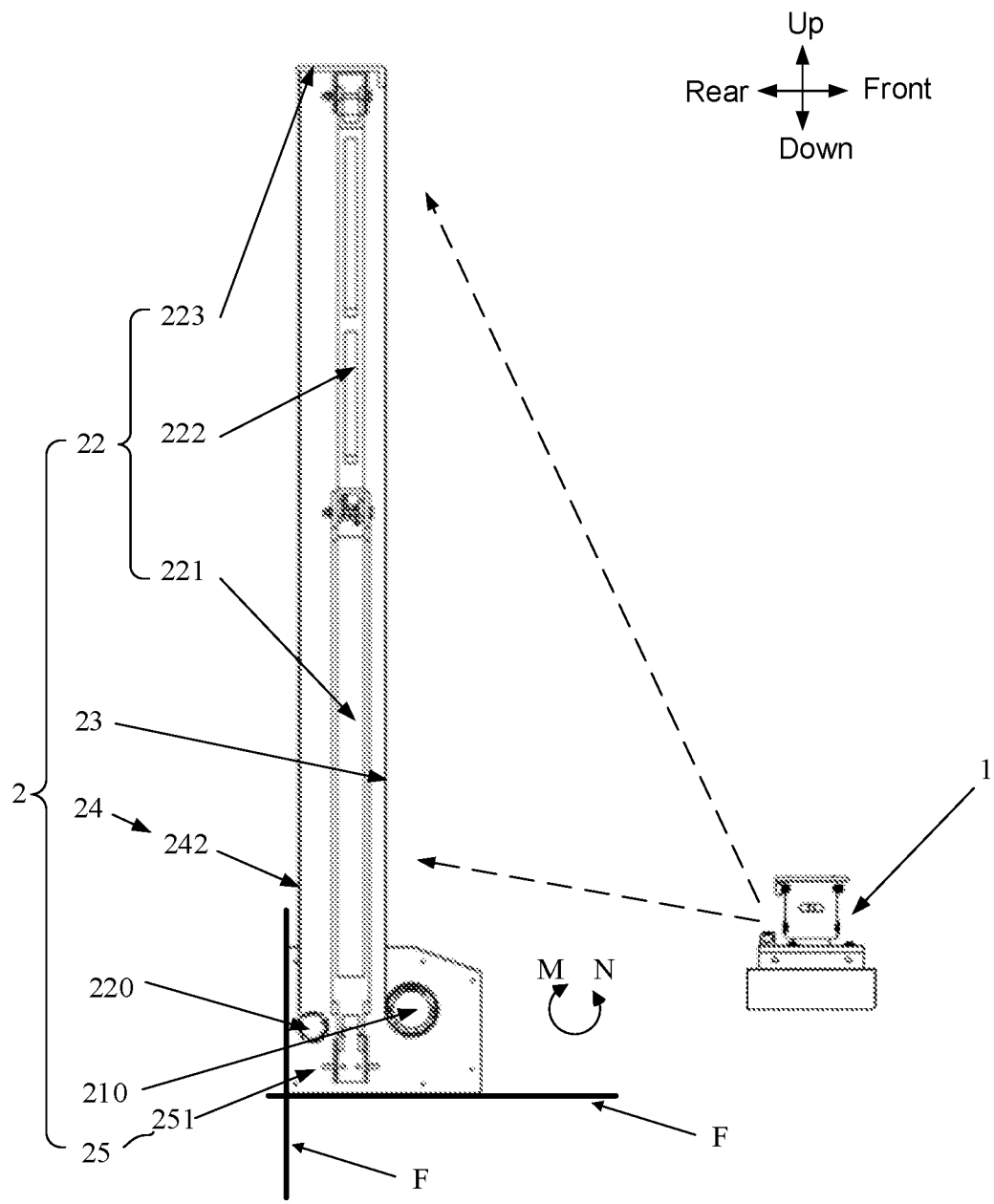
FIG. 1B is a side view of another projection apparatus, in accordance with some embodiments.

In other embodiments, as shown in FIG. 1B, the rolling mechanism 21 includes a first sub-rolling mechanism 210 and a second sub-rolling mechanism 220. The first end of the optical curtain 23 is fixedly connected to the first sub-rolling mechanism 210, and the first end of the tensioning assembly 242 is fixedly connected to the second sub-rolling mechanism 220. A structure of the first sub-rolling mechanism 210 and a structure of the second sub-rolling mechanism 220 are same as a structure of the rolling mechanism 21. In addition, the auxiliary roller 241 is replaced by the second sub-rolling mechanism 220, so that the auxiliary roller 241 is omitted.

The first sub-rolling mechanism 210 is capable of controlling the optical curtain 23 independently, so as to directly adjust the pitch angle of the optical curtain 23 by increasing or decreasing the tension on the optical curtain 23. The second sub-rolling mechanism 220 is capable of controlling the tensioning assembly 242 independently, so as to indirectly adjust the pitch angle of the optical curtain 23 by increasing or decreasing the tension on the tensioning assembly 242.

The optical curtain 23 is independently controlled by the first sub-rolling mechanism 210, and the tensioning assembly 242 is independently controlled by the second sub-rolling mechanism 220, so that the adjustment of the pitch angle of the optical curtain 23 is more flexible.

FIG. 5 is a diagram showing a structure of a lifting mechanism, in accordance with some embodiments.

In some embodiments, as shown in FIG. 5, the lifting mechanism 22 further includes a lifting controller 224 and a lifting motor 225. The lifting controller 224 is electrically connected to the lifting motor 225, and the lifting motor 225 is fixed on the base 25. The lifting controller 224 is capable of controlling a start and stop of the lifting motor 225, an output shaft of the lifting motor 225 is connected to the first end of the first supporting rod 221, and the lifting motor 225 is capable of adjusting a distance between the second end of the second supporting rod 222 and the base 25.

In this way, after the lifting controller 224 controls the lifting motor 225 to start, the lifting motor 225 may drive the first supporting rod 221 and the second supporting rod 222 to rise, thereby driving the optical curtain 23 to rise. In this case, unfolding of the optical curtain 23 may be achieved while the optical curtain 23 wrapped on the rolling mechanism 21 may rotate in a reverse direction (a clockwise direction from N to M in FIG. 1A).

In addition, in a case where the lifting motor 225 drives the first supporting rod 221 and the second supporting rod 222 to descend, the optical curtain 23 is driven to descend. In this case, wrapping the optical curtain 23 may be achieved while the rolling mechanism 21 controls the optical curtain 23 to rotate in a forward direction (a counterclockwise direction from M to N in FIG. 1A).

In some embodiments, the projection screen 2 includes two groups of lifting mechanisms 22. In this way, one group of lifting mechanism 22 is arranged at each end of the rolling mechanism 21 in an axial direction thereof. Each group of lifting mechanism 22 unfolds the optical curtain 23 through two ends of a side of the optical curtain 23 (e.g., upper and lower ends of a left or right side of the optical curtain 23 in FIG. 5).

Of course, the projection screen 2 may further include three groups of lifting mechanisms 22. In this way, one group of lifting mechanism 22 is arranged at each end of the rolling mechanism 21 in the axial direction thereof, and the last group of lifting mechanism 22 is arranged at a middle of the rolling mechanism 21. That is, the last group of lifting mechanism 22 is arranged between the previous two groups of lifting mechanisms 22.

Next, the tensioning mechanism 24 of the projection screen 2 will be explained in detail.

Figure 6:
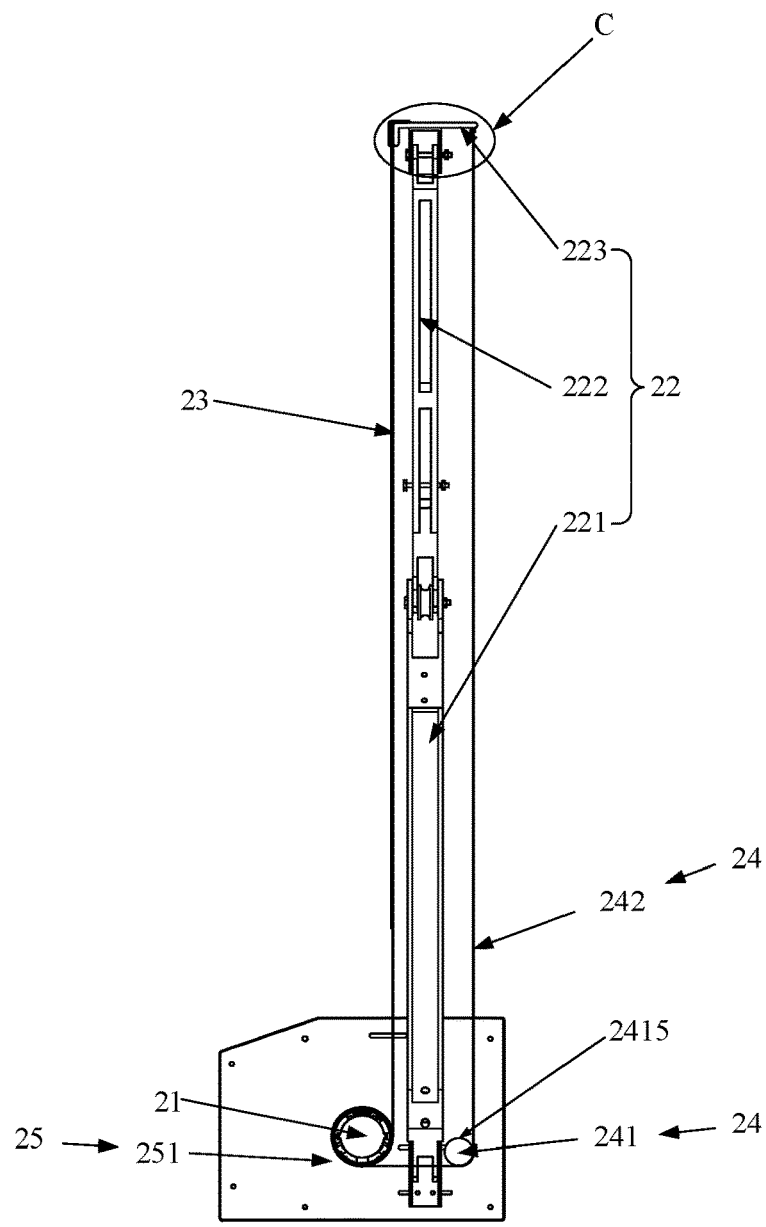
FIG. 6 is a side view of a projection screen, in accordance with some embodiments.
Figure 7:
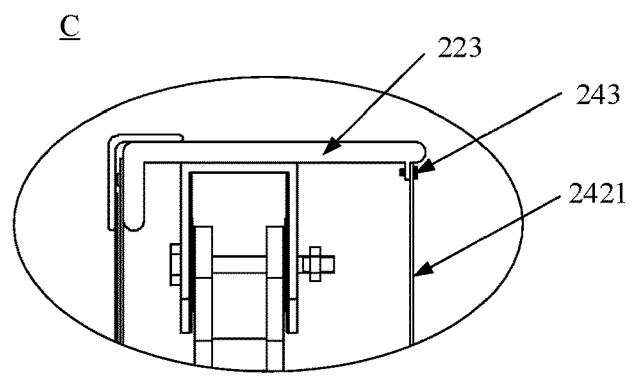
FIG. 7 is a partial enlarged view of circle C in FIG. 6.

FIG. 6 is a side view of a projection screen, in accordance with some embodiments. FIG. 7 is a partial enlarged view of circle C in FIG. 6. In some embodiments, as shown in FIG. 6, the base 25 includes two side walls 251, both ends of the auxiliary roller 241 are connected to the side walls 251 of the base 25. In this way, with a cooperation of the rolling mechanism 21 and the lifting mechanism 22, folding or unfolding of the tensioning assembly 242 may be achieved, and in turn, in a case where the optical curtain 23 is connected to both of the rolling mechanism 21 and the lifting mechanism 22, synchronous folding (or unfolding) of the optical curtain 23 and the tensioning assembly 242 may be achieved. In addition, since the auxiliary roller 241 is pressed on the tensioning assembly 242, the tension of the tensioning assembly 242 on the second end of the lifting mechanism 22 may be controlled.

In some embodiments, the tensioning assembly 242 includes a piece of cloth 2421 or a plurality of ropes 2422.

In a case where the lifting mechanism 22 includes a beam 223 and the tensioning mechanism 242 includes a piece of cloth 2421, a side of the cloth 2421 away from the rolling mechanism 21 is fixedly connected to the second side 2232 of the beam 223, and another side of the cloth 2421 proximate to the rolling mechanism 21 is fixedly connected to the rolling mechanism 21. In this way, the cloth 2421 tensions the optical curtain 23 through the beam 223.

As shown in FIGS. 6 and 7, the cloth 2421 is fixedly connected to the beam 223 through a first screw 243. Alternatively, the cloth 2421 may also be fixedly connected to the beam 223 by bonding. Of course, the cloth 2421 may also be fixedly connected to the beam 223 by other manners, and the present disclosure is not limited thereto.

Figure 8:
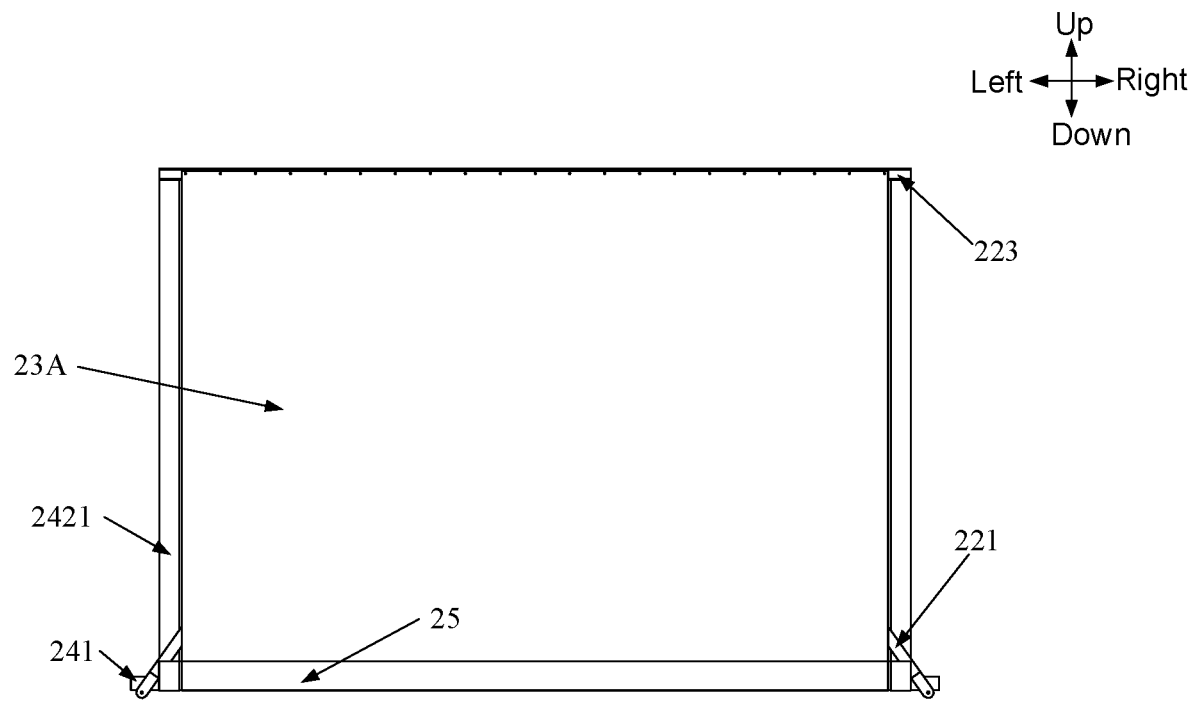
FIG. 8 is a front view of a projection screen, in accordance with some embodiments.

FIG. 8 is a front view of a projection screen, in accordance with some embodiments.

In some embodiments, as shown in FIG. 8, a length of the side of the cloth 2421 and a length of a second side of the optical curtain 23 away from the rolling mechanism 21 are less than or equal to a length of the beam 223. In this way, on condition that a force on a side of the lifting mechanism 22 proximate to the rolling mechanism 21 is balanced with a force on a side of the lifting mechanism 22 proximate to the tensioning mechanism 24, the beam 223 may limit the cloth 2421 and the optical curtain 23 comprehensively.

Figure 9:
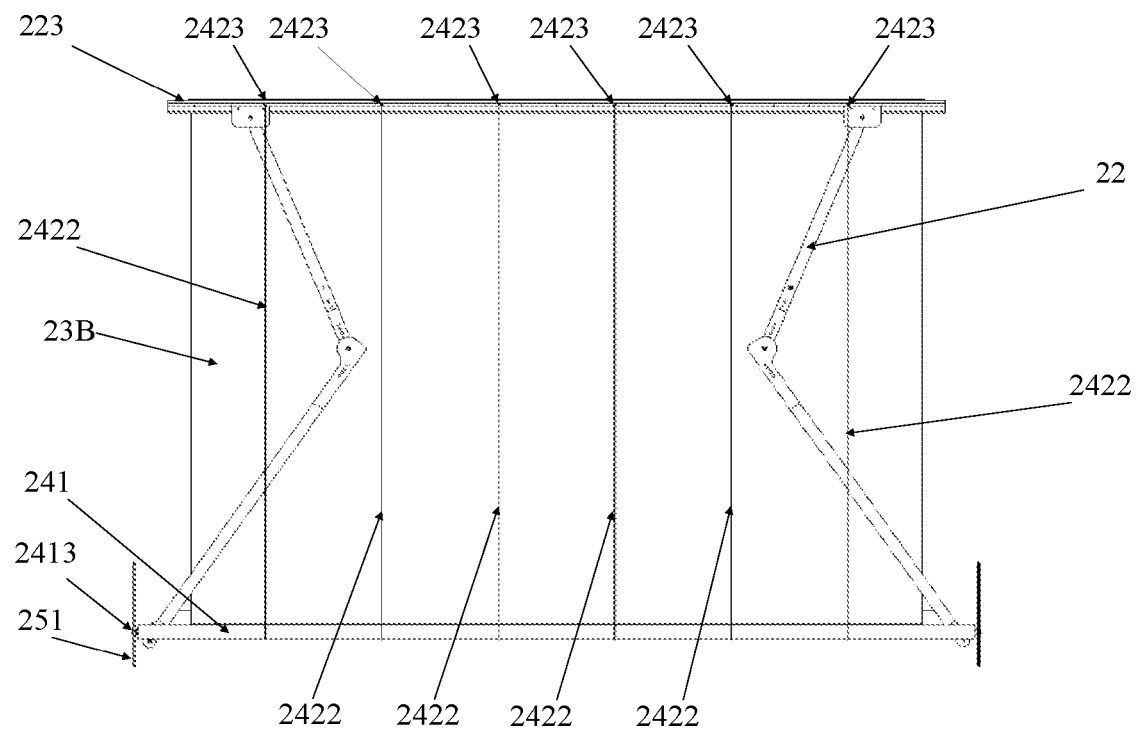
FIG. 9 is a rear view of a projection screen, in accordance with some embodiments.

FIG. 9 is a rear view of a projection screen, in accordance with some embodiments.

As shown in FIG. 9, in a case where the tensioning assembly 242 includes a plurality of ropes 2422. Any two ropes 2422 are parallel to each other, a first end of each rope 2422 may be fixedly connected to the rolling mechanism 21, and a second end of each rope 2422 may be fixedly connected to the second side 2232 of the beam 223 (referring to FIG. 3). In this way, the optical curtain 23 may be tensioned through the plurality of ropes 2422 and the beam 223.

Figure 10:
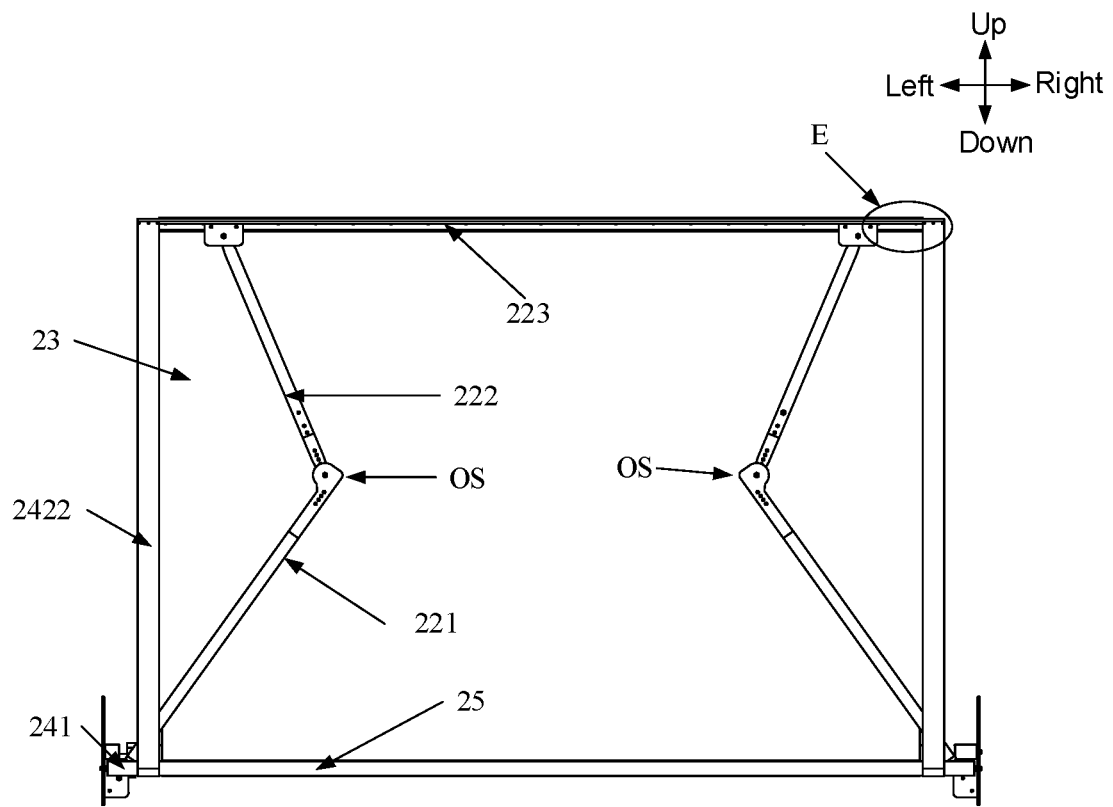
FIG. 10 is a rear view of another projection screen, in accordance with some embodiments.
Figure 11:
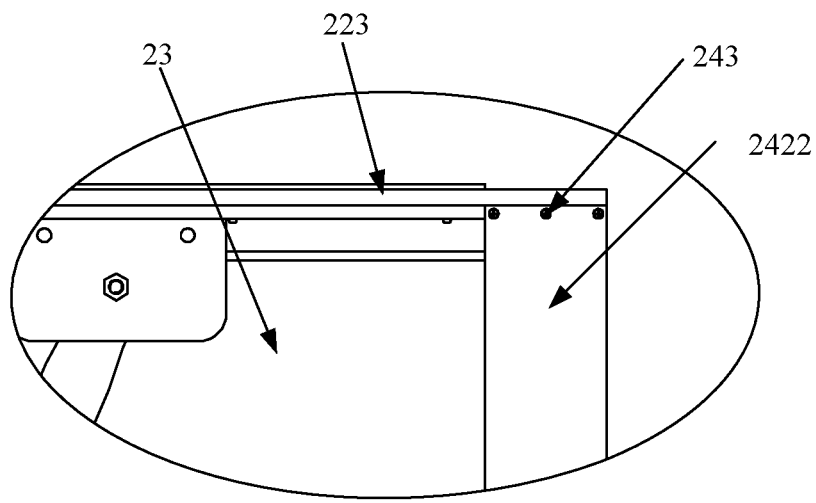
FIG. 11 is a partial enlarged view of circle E in FIG. 10.

FIG. 10 is a rear view of another projection screen, in accordance with some embodiments. FIG. 11 is a partial enlarged view of circle E in FIG. 10.

As shown in FIG. 9, in a case where the tensioning assembly 242 includes the plurality of ropes 2422, the beam 223 includes a plurality of fixing holes 2423 in one-to-one correspondence with the plurality of ropes 2422, and each rope 2422 is connected (e.g., bonded) to the beam 223 through a corresponding fixing hole 2423. Of course, each rope 2422 may also be fixedly connected to the beam 223 in other manners, and the present disclosure is not limited thereto. For example, as shown in FIGS. 10 and 11, each rope 2422 is fixedly connected to the beam 223 through one or more first screws 243.

A distance between any two adjacent ropes 2422 may be equal to each other, so that a tension of each rope 2422 applying on the beam 223 is equal, and it is conducive to ensuring the stability of the beam 223 and the beam 223 is not easy to deflect. In some embodiments, the auxiliary roller 241 has a strip structure extending in a direction parallel to an axial direction of the rolling mechanism 21. In this way, it is beneficial for the auxiliary roller 241 to press the tensioning assembly 242, so as to limit the tensioning assembly 242 in a large range. In addition, since an extension direction of the auxiliary roller 241 is parallel to the axial direction of the rolling mechanism 21, the flatness of the tensioning assembly 242 may be ensured through the auxiliary roller 241.

A cross-sectional shape of the auxiliary roller 241 may be circular or polygonal, the present disclosure is not limited thereto. The auxiliary roller 241 with a circular cross-section is convenient for manufacturing, and a surface of the auxiliary roller 241 is smooth, which is not easy to damage the tensioning assembly 242. The auxiliary roller 241 with a polygonal cross-section (e.g., square or hexagon) has strong stability and is not easy to shake.

In some embodiments, as shown in FIG. 6, the auxiliary roller 241 has a first lubricating coating 2415. The first lubricating coating 2415 may be located on an outer surface of the auxiliary roller 241. In this way, a friction between the auxiliary roller 241 and the tensioning assembly 242 may be reduced through the first lubricating coating 2415, so that relative movement between the auxiliary roller 241 and the tensioning assembly 242 may be more smooth. In addition, it is also possible to avoid scratching the tensioning assembly 242 due to that the surface of the auxiliary roller 241 is not smooth, and it is conducive to prolonging a service life of the tensioning assembly 242.

The first lubricating coating 2415 may be a coating composed of flexible particles or a colloidal coating, and the present disclosure is not limited thereto.

In some embodiments, in a case where the tensioning assembly 242 is wrapped or unfolded, the auxiliary roller 241 may be fixed, that is, both ends of the auxiliary roller 241 are fixedly connected to the side walls 251 of the base 25. Of course, the auxiliary roller 241 may also rotate around its own axis, that is, both ends of the auxiliary roller 241 may be rotatably connected to the side walls 251 of the base 25.

In a case where the auxiliary roller 241 is capable of rotating, when the rolling mechanism 21 rotates to retract the tensioning assembly 242, or when the lifting mechanism 22 controls the unfolding of the tensioning assembly 242, the auxiliary roller 241 rotates, so as to further reduce the friction between the auxiliary roller 241 and the tensioning assembly 242 and prolong the service life of the tensioning assembly 242.

In some embodiments, during the unfolding of the optical curtain 23, the control mechanism 26 (referring to FIG. 18) may control the auxiliary roller 241 to move away from the tensioning assembly 242, so as to release the tensioning assembly 242. After an unfolding process of the optical curtain 23 is accomplished, the control mechanism 26 may control the auxiliary roller 241 to press on the tensioning assembly 242, so as to limit the pitch angle of the optical curtain 23. During the wrapping process of the optical curtain 23, the control mechanism 26 may remove the auxiliary roller 241 originally pressed on the tensioning assembly 242, so as to avoid friction caused by direct contact between the auxiliary roller 241 and the tensioning assembly 242. In a case where the projection screen 2 is used next time, the auxiliary roller 241 may be maintained at a current position until the unfolding process of the optical curtain 23 is accomplished. After the unfolding process of the optical curtain 23 is accomplished, the control mechanism 26 may control the auxiliary roller 241 to press on the tensioning assembly 242.

In a case where the auxiliary roller 241 is capable of rotating, in some embodiments, a cross-section of the auxiliary roller 241 is circular. In this case, both ends of the auxiliary roller 241 are rotatably connected to the side walls 251 of the base 25 through bearings.

Figure 12:
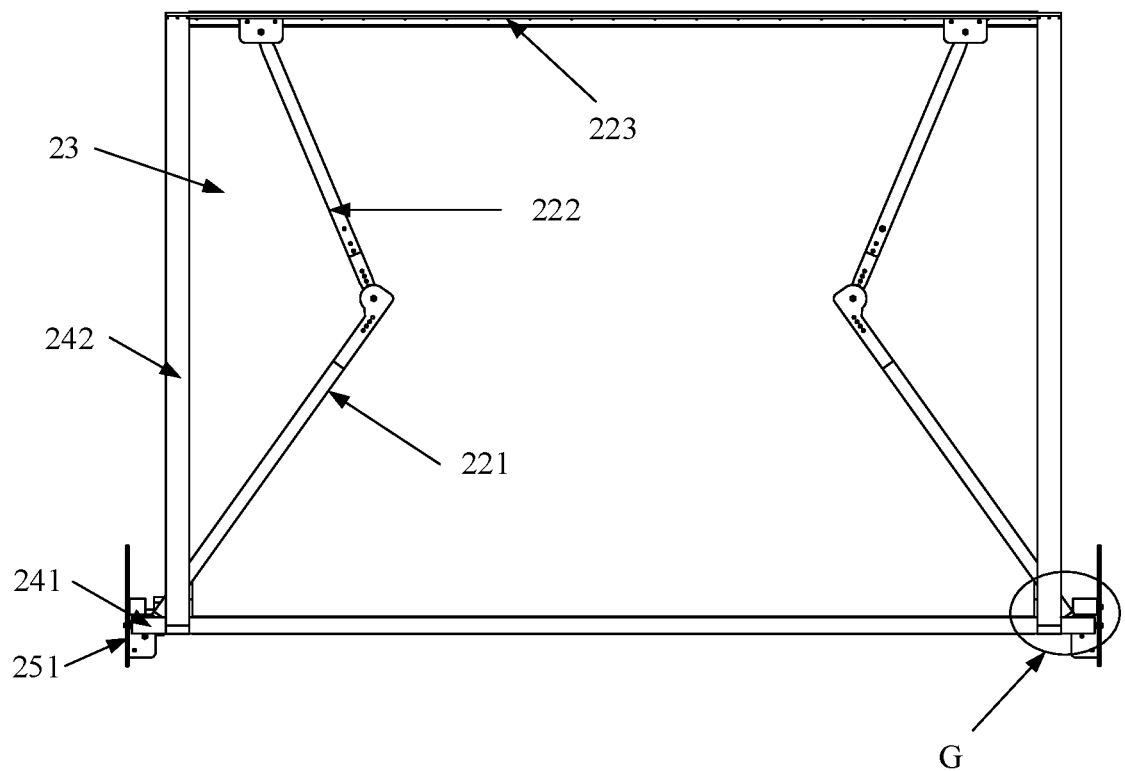
FIG. 12 is a rear view of yet another projection screen, in accordance with some embodiments.
Figure 13:
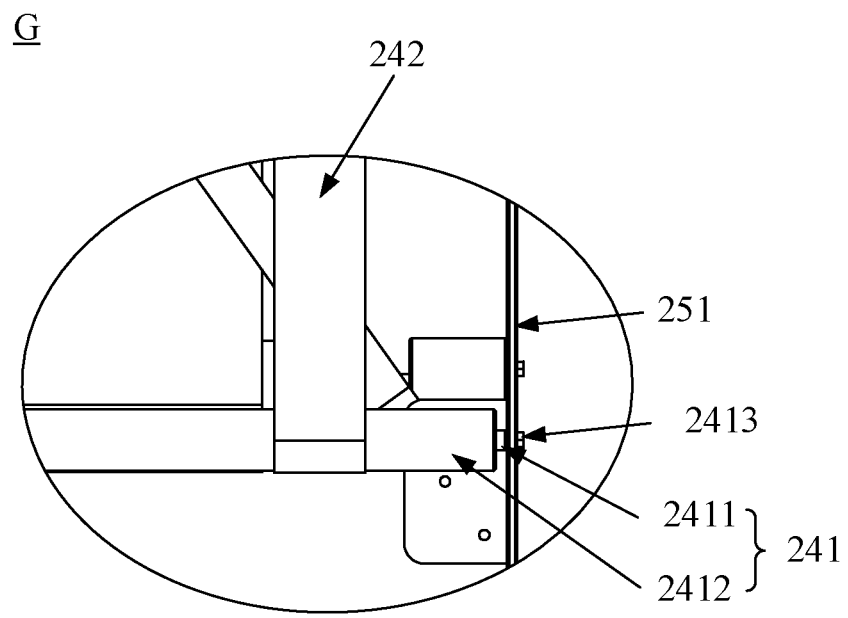
FIG. 13 is a partial enlarged view of Circle G in FIG. 12.

FIG. 12 is a rear view of yet another projection screen, in accordance with some embodiments. FIG. 13 is a partial enlarged view of Circle G in FIG. 12.

In some embodiments, as shown in FIGS. 12 and 13, the auxiliary roller 241 includes a central shaft 2411 and a drum 2412. The drum 2412 may be hollow cylindrical or hollow prismatic. Both ends of the central shaft 2411 are connected to the side walls 251 of the base 25. The drum 2412 is rotatably sleeved on the central shaft 2411, and the drum 2412 is pressed on the tensioning assembly 242.

In this way, since the drum 2412 may rotate around the central shaft 2411, in a case where the rolling mechanism 21 folds or unfolds the tensioning assembly 242, there will be relative movement between the tensioning assembly 242 and the drum 2412. Since the drum 2412 may rotate around the central shaft 2411, the friction between the drum 2412 and the tensioning assembly 242 may be significantly reduced, so as to reduce wear of the tensioning assembly 242 and improve the flexibility of the rolling mechanism 21 to fold and unfold the tensioning assembly 242.

As shown in FIGS. 12 and 13, the end of the central shaft 2411 may be fixed to the side wall 251 of the base 25 through a second screw 2413 or a locking nut.

In a case where both ends of the auxiliary roller 241 are fixedly connected to the side walls 251 of the base 25, the ends of the auxiliary roller 241 are fixedly connected to the side walls 251 of the base 25, so as to achieve the fixation between the auxiliary roller 241 and the side walls 251 of the base 25. Alternatively, the ends of the auxiliary roller 241 are movably disposed in the side walls 251 of the base 25.

Figure 14:
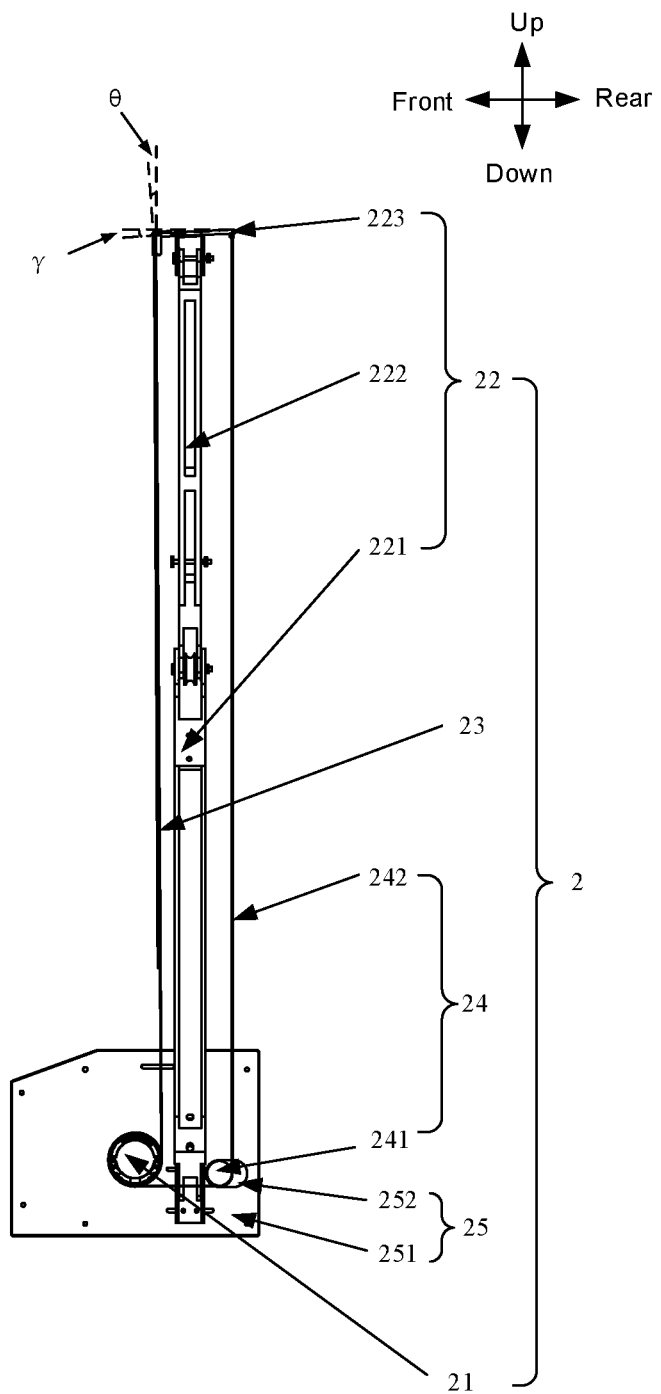
FIG. 14 is a side view of a projection screen tilted forward, in accordance with some embodiments.
Figure 15:
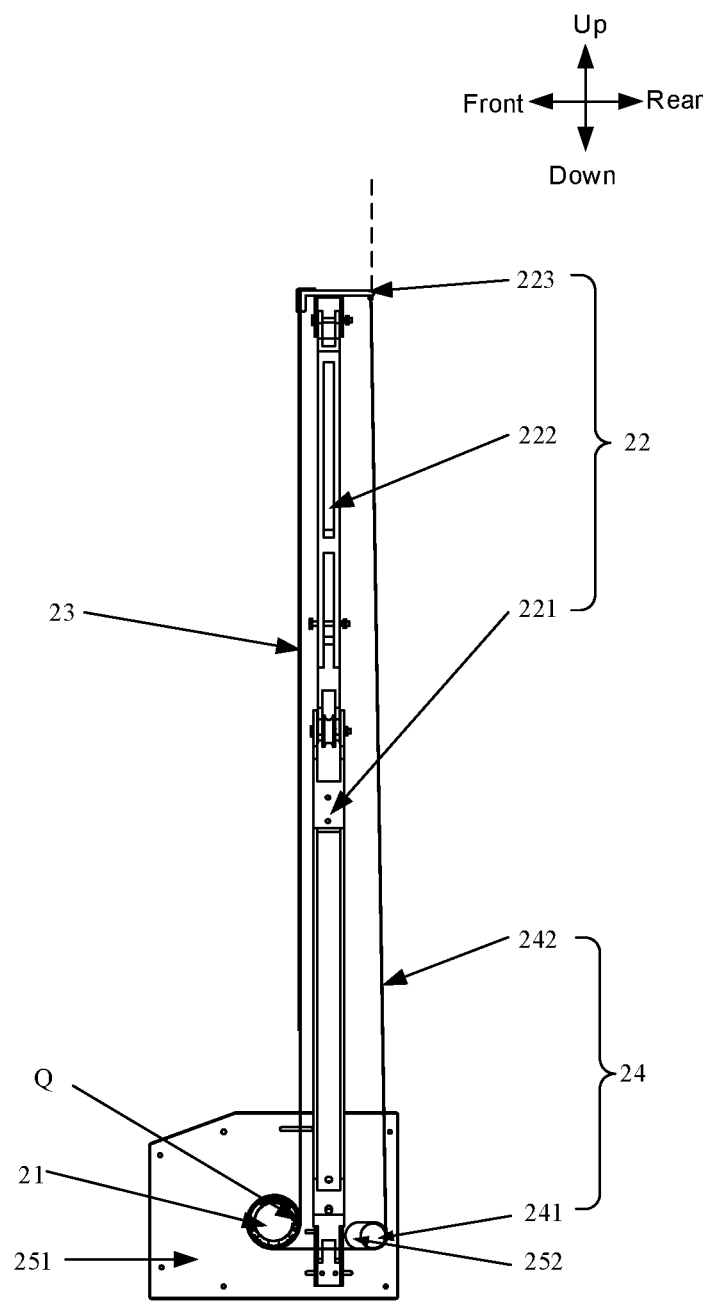
FIG. 15 is a side view of the projection screen in FIG. 14 after being adjusted, in accordance with some embodiments.

FIG. 14 is a side view of a projection screen tilted forward, in accordance with some embodiments. FIG. 15 is a side view of the projection screen in FIG. 14 after being adjusted, in accordance with some embodiments.

A case where the auxiliary roller 241 is movable is described below. In some embodiments, as shown in FIG. 14 or FIG. 15, the side wall 251 of the base 25 is provided with a guide groove 252, and the end of the auxiliary roller 241 passes through the guide groove 252 and is capable of moving in a length direction (referring to the front-rear direction in FIG. 14 or FIG. 15) of the guide groove 252.

In this way, after the auxiliary roller 241 contacts the tensioning assembly 242 and continues to move in the length direction of the guide groove 252, the auxiliary roller 241 may push the tensioning assembly 242 to be tensioned continuingly. Since the first end of the tensioning assembly 242 is fixedly connected to the rolling mechanism 21, the second end of the tensioning assembly 242 is fixedly connected to the second end of the lifting mechanism 22, and the lifting mechanism 22 and the rolling mechanism 21 are in a stationary state, in a case where the auxiliary roller 241 pushes the tensioning assembly 242, a pressing force of the auxiliary roller 241 on the tensioning assembly 242 may be increased to tension the tensioning assembly 242. In this way, the tension of the tensioning assembly 242 on the second end of the lifting mechanism 22 may be increased.

Similarly, in a case where the auxiliary roller 241 is away from the tensioning assembly 242 in the length direction of the guide groove 252, the pressing force of the auxiliary roller 241 on the tensioning assembly 242 may be decreased, and the tension of the tensioning assembly 242 on the second end of the lifting mechanism 22 may be decreased.

The adjustment of the pressing force of the tensioning assembly 242 may be achieved through the auxiliary roller 241, so as to change the pitch angle of the optical screen 23. In a case where the pitch angle of the optical curtain 23 is changed to a target pitch angle, the auxiliary roller 241 may be controlled to stop moving and the auxiliary roller 241 may be fixed, so as to limit the pitch angle of the optical curtain 23.

For example, as shown in FIG. 14, the optical curtain 23 tilts forward, and the tension of the optical curtain 23 on the second end of the lifting mechanism 22 is greater than the tension of the tensioning assembly 242 on the second end of the lifting mechanism 22. In this case, the auxiliary roller 241 may be adjusted to move away from the optical curtain 23 in the guide groove 252 (e.g., moving from the front to back as shown in FIG. 14), so as to make the auxiliary roller 241 further tension the tensioning assembly 242, and achieve further tensioning of the tensioning assembly 242 to the second end of the lifting mechanism 22 (FIG. 15 showing the adjusted state of the projection screen). As a result, the tension of the optical curtain 23 on the second end of the lifting mechanism 22 is balanced, the adjustment of an inclination angle of the optical curtain 23 is achieved, and that the adjusted optical curtain 23 is at the target pitch angle is ensured.

For example, in FIG. 14, the projection screen 2 tilts forward at an angle of a After the projection screen 2 in FIG. 15 is adjusted, a plane where the optical curtain 23 is located is substantially parallel to a vertical plane.

It will be noted that, the target pitch angle of the optical curtain 23 is an included angle between a plane where the optical curtain 23 is located and the vertical plane (or the plumb line). For example, the target pitch angle of the optical curtain 23 may be 0°, 1°, 2°, 3°, 4° or 5°. The target pitch angle of the optical curtain 23 may be set according to factors such as an angle of the light beams emitted by the optical engine 1.

Both side walls 251 of the base 25 are provided with guide grooves 252, so that both ends of the auxiliary roller 241 pass through corresponding guide grooves 252, so as to facilitate fixation of the auxiliary roller 241.

Figure 16:
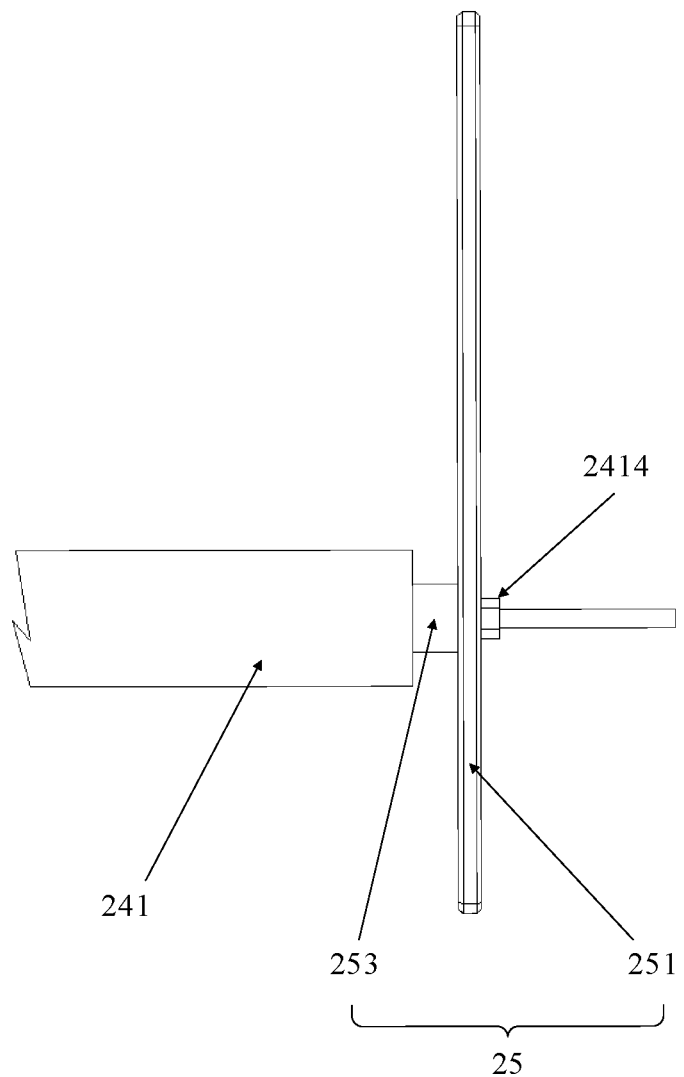
FIG. 16 is a diagram showing a fixing manner of an auxiliary roller, in accordance with some embodiments.
Figure 17:
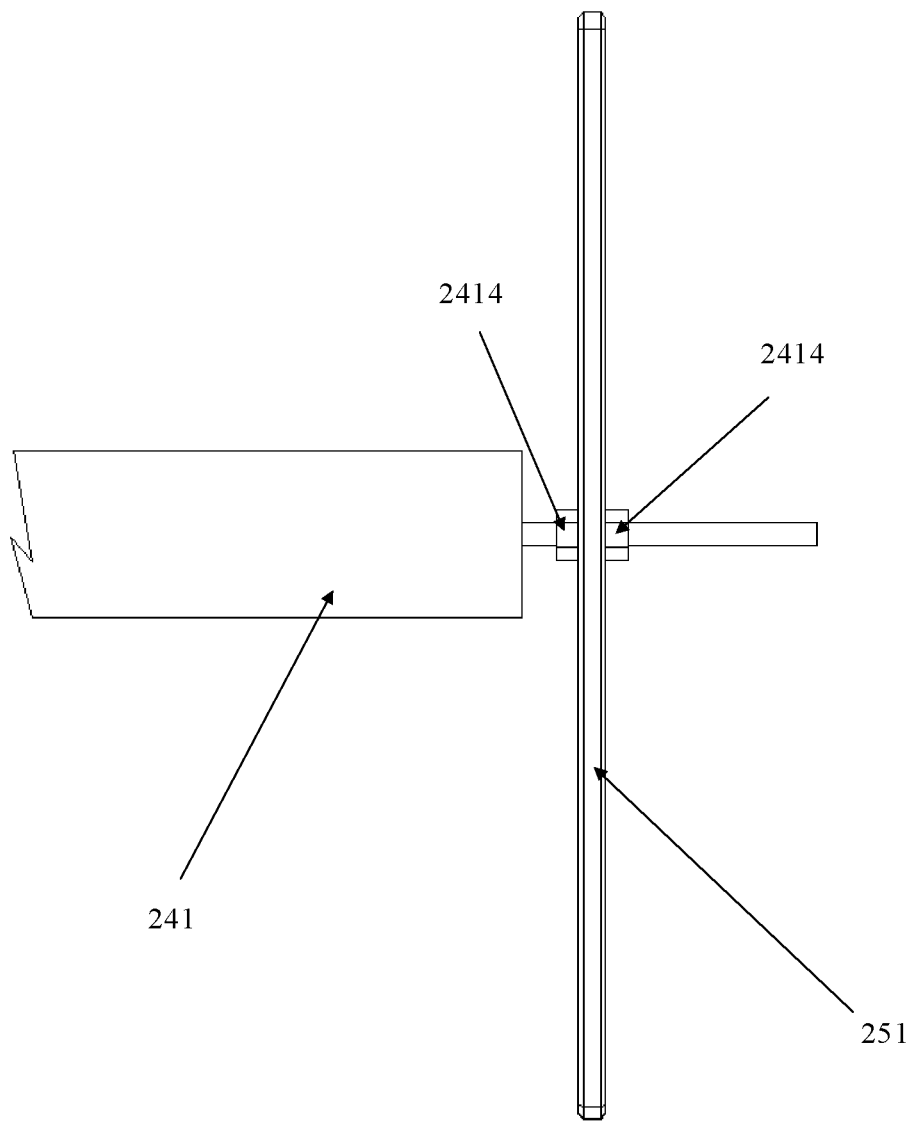
FIG. 17 is a diagram showing a fixing manner of another auxiliary roller, in accordance with some embodiments.

FIG. 16 is a diagram showing a fixing manner of an auxiliary roller, in accordance with some embodiments. FIG. 17 is a diagram showing a fixing manner of another auxiliary roller, in accordance with some embodiments.

In some embodiments, as shown in FIG. 16, a fixing nut 2414 may be disposed at each end of the auxiliary roller 241, and each fixing nut 2414 may be tightened. A corresponding fixing nut 2414 is located at a side of a side wall 251 away from the auxiliary roller 241, so as to achieve the fixation of the auxiliary roller 241.

In some embodiments, as shown in FIG. 17, two fixing nuts 2414 may also be disposed at each end of the auxiliary roller 241, and the two fixing nuts 2414 at each end are located on both sides of the side wall 251.

It will be noted that, in a case where the auxiliary roller 241 includes the central shaft 2411 and the drum 2412, after the auxiliary roller 241 is controlled to stop moving, both ends of the central shaft 2411 may be fixed in the guide groove 252. In this way, movement of the auxiliary roller 241 may be avoided and relative rotation between the auxiliary roller 241 and the optical curtain 23 may be ensured.

An orthogonal projection of the guide groove 252 on the side wall 251 of the base 25 may be in a shape of a long strip or an oval, as long as the auxiliary roller 241 may move in the length direction of the guide groove 252 and the auxiliary roller 241 is locked in a case where the auxiliary roller 241 moves to a target position. A shape of the guide groove 252 is not limited in the present disclosure.

A width direction of the guide groove 252 may refer to the up-down direction in FIG. 14 or FIG. 15. A width of the guide groove 252 may be slightly larger than a maximum size (e.g., a diameter or a side length) of the cross-section of the auxiliary roller 241. In this way, the auxiliary roller 241 may move in the length direction of the guide groove 252 more flexibly.

As shown in FIG. 18, a length T of the guide groove 252 may be set according to an extreme inclination amount of the tensioning assembly 242 in the length direction of the guide groove 252. The length of the guide groove 252 may be slightly greater than the extreme inclination amount, so as to avoid limiting a movement amount of the auxiliary roller 241 in a case where the auxiliary roller 241 limits the pitch angle of the optical curtain 23.

It will be noted that, the above extreme inclination amount is a maximum length component of a length of the tensioning assembly 242 in the length direction of the guide groove 252 in a case where the projection screen is inclined.

In some embodiments, the length direction of the guide groove 252 is substantially parallel to a horizontal direction (e.g., being parallel to the horizontal plane), or the length direction of the guide groove 252 is inclined by a predetermined angle with respect to the horizontal direction.

The predetermined angle is in a range of 0° to 10° inclusive. For example, the predetermined angle may be 0°, 2°, 4°, 6°, 8° or 10°.

It will be noted that, the predetermined angle may be set according to the target pitch angle of the optical curtain 23, as long as the auxiliary roller 241 is capable of limiting the pitch angle of the optical curtain 23 to the target pitch angle when the auxiliary roller 241 moves in the length direction of the guide groove 252, and the present disclosure is not limited thereto.

In a case where an included angle between the length direction of the guide groove 252 and the horizontal direction is an acute angle, when the auxiliary roller 241 moves in the length direction of the guide groove 252, a movement component of the auxiliary roller 241 may be generated in the horizontal direction. Therefore, in the horizontal direction, a positional relationship among a contact position between the tensioning assembly 242 and the auxiliary roller 241, the first end of the tensioning assembly 242, and the second end of the tensioning assembly 242 may be adjusted. Thus, the adjustment of the pressing force of the auxiliary roller 241 on the tensioning assembly 242 may be achieved.

In some embodiments, as shown in FIG. 16, the base 25 further includes a lubricating member 253, the lubricating member 253 is fixedly connected to the auxiliary roller 241 and located in the guide groove 252. The lubricating member 253 is configured to fit with an inner wall of the guide groove 252. In this way, friction between the auxiliary roller 241 and the guide groove 252 may be reduced through the lubricating member 253, smoothness of the movement of the auxiliary roller 241 in the guide groove 252 may be enhanced, and movement accuracy of the auxiliary roller 241 may be improved.

The lubricating member 253 may be, for example, made of a material having lubricating properties such as plastic or graphite.

In some embodiments, the movement of the auxiliary roller 241 may be achieved by automatic control.

FIG. 18 is a diagram showing a structure of a control mechanism, in accordance with some embodiments. As shown in FIG. 18, the projection screen 2 further includes a control mechanism 26. The control mechanism 26 is connected to the auxiliary roller 241, and the control mechanism 26 is configured to drive the auxiliary roller 241 to move in the length direction of the guide groove 252.

In this way, automatic control of the movement of the auxiliary roller 241 may be achieved, the movement amount and movement accuracy of the auxiliary roller 241 may be ensured, and the pressing force of the auxiliary roller 241 on the tensioning assembly 242 may be accurately controlled, so as to accurately limit the pitch angle of the optical curtain 23.

As shown in FIG. 18, the control mechanism 26 includes a controlling motor 261, a transmission component 262, an adjustment nut 263 and an adjustment controller 264.

In some embodiments, the controlling motor 261 may be a gear motor. The controlling motor 261 and the transmission component 262 may be directly fixed to the base 25. The transmission component 262 is connected to an output shaft of the controlling motor 261. The adjustment nut 263 extends in an extending direction of the auxiliary roller 241. An end of the adjustment nut 263 away from the auxiliary roller 241 is threadedly connected to the transmission component 262, and another end of the adjustment nut 263 proximate to the auxiliary roller 241 is fixedly connected to the auxiliary roller 241. The adjustment controller 264 is electrically connected to the controlling motor 261, so as to control an operating time of the controlling motor 261. A moving distance of the auxiliary roller 241 may be determined by the operating time of the controlling motor 261, so that the controlling motor 261 is capable of controlling the accurate movement of the auxiliary roller 241 through a cooperation of the transmission component 262 and the adjustment nut 263.

The adjustment controller 264 may be a single chip microcomputer, a programmable logic controller (PLC), a programmable auto controller (PAC), or a remote terminal unit (RTU). The remote terminal unit may be, for example, a computer, a mobile phone, or a tablet computer.

In this way, the controlling motor 261 receives a control command sent by the adjustment controller 264, so that the output shaft of the controlling motor 261 may rotate based on the control command, thereby driving the transmission component 262 to rotate together. Since the adjustment nut 263 is threadly connected to the transmission component 262 in an axial direction of the transmission component 262, when the transmission component 262 rotates, the adjustment nut 263 may be driven to move in the length direction of the guide groove 252. In this way, when the adjustment nut 263 moves, the auxiliary roller 241 fixedly connected to the adjustment nut 263 may move in the length direction of the guide groove 252, so that the adjustment of the position of the auxiliary roller 241 may be achieved.

In a case where the auxiliary roller 241 and the tensioning assembly 242 adjust the pitch angle of the optical curtain 23 to the target pitch angle, the adjustment controller 264 may send a stop command to the controlling motor 261, so as to control the controlling motor 261 to stop rotating, and in turn, the transmission component 262 and the adjustment nut 263 may stop moving. In this way, the auxiliary roller 241 may be limited on a stationary adjustment nut 263, and the auxiliary roller 241 remains fixed so that the optical curtain 23 may be maintained at the target pitch angle.

Herein, after the control mechanism 26 controls the auxiliary roller 241 to stop moving, limit of the auxiliary roller 241 may be achieved through the adjustment nut 263.

Of course, the connection among the controlling motor 261, the transmission component 262 and the adjustment nut 263 may also be achieved in other manners, as long as the auxiliary roller 241 may be driven to move in the length direction of the guide groove 252, and the present disclosure is not limited thereto.

Figure 19:
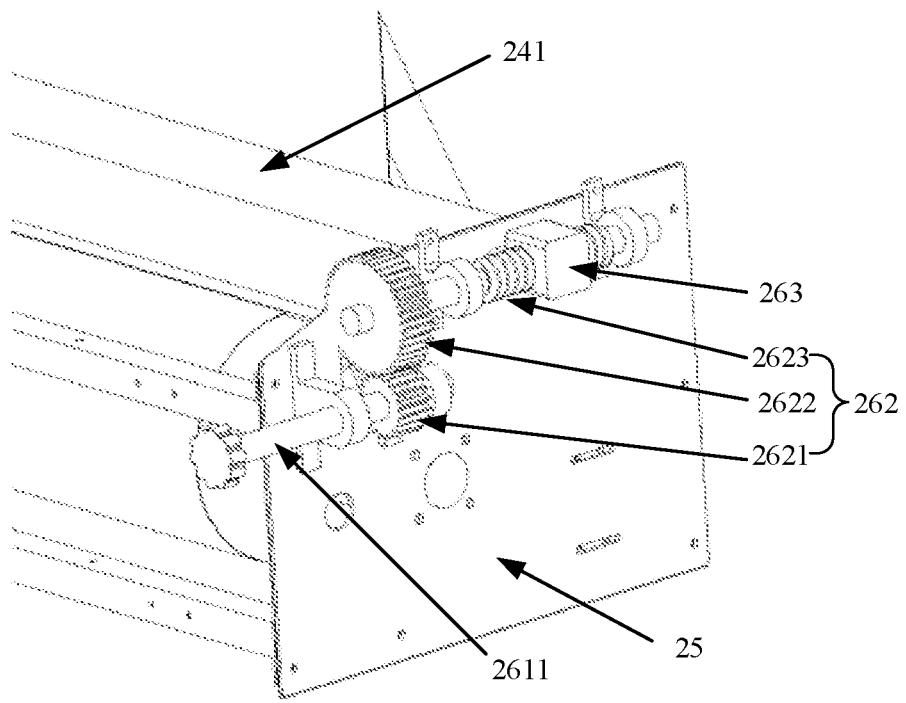
FIG. 19 is a diagram showing a structure of a transmission component, in accordance with some embodiments.

FIG. 19 is a diagram showing a structure of a transmission component, in accordance with some embodiments.

In some embodiments, as shown in FIG. 19, the transmission component 262 includes a first gear 2621, a second gear 2622 and a lead screw 2623, and the first gear 2621 and the second gear 2622 engage with each other. The first gear 2621 may be fixedly connected to an output shaft 2611 of the controlling motor 261. An end of the lead screw 2623 is connected to the second gear 2622, and another end of the lead screw 2623 is threadly connected to the adjustment nut 263. For example, the second gear 2622 is fixedly connected to an end of the lead screw 2623 proximate to the first gear 2621, and may rotate synchronously with the first gear 2621 driven by the motor 261. Another end of the lead screw 2623 away from the first gear 2621 is threadly connected to the adjustment nut 263. In this way, the lead screw 2623 may be driven to rotate by the rotation of the second gear 2622.

Of course, the transmission component 262 may also be implemented in other manners, such as chain transmission or belt transmission, as long as power output by the controlling motor 261 may be transmitted to the adjustment nut 263, so as to move the adjustment nut 263 along the guide groove 252, and the present disclosure is not limited thereto.

Of course, in some embodiments, the movement amount of the auxiliary roller 241 may also be manually adjusted.

For example, the auxiliary roller 241 may also move in the guide groove 252 in a rolling manner. In some embodiments, in addition to adjusting the pitch angle of the optical curtain 23 through the tensioning assembly 242, the pitch angle of the optical curtain 23 may further be adjusted in other manners.

For example, as shown in FIG. 18, the projection screen 2 further includes a guide roller 27. The pitch angle of the optical curtain 23 may be adjusted through the guide roller 27. In some embodiments, the guide roller 27 is disposed on the base 25 and may be pressed on the optical curtain 23, so as to limit the pitch angle of the optical curtain 23.

It will be noted that, a structure and connection manner of the guide roller 27 are similar to that of the auxiliary roller 241, except that the auxiliary roller 241 is pressed on the tensioning assembly 242, while the guide roller 27 is pressed on the optical curtain 23.

In some embodiments, as shown in FIGS. 8 and 9, the optical curtain 23 includes a first surface 23A and a second surface 23B. A surface of the optical curtain 23 away from the lifting mechanism 22 is the first surface 23A, and a surface of the optical curtain 23 proximate to the lifting mechanism 22 is the second surface 23B. In the horizontal direction, in a case where an intersection line between the optical curtain 23 and the rolling mechanism 21 (e.g., the straight line passing through the point Q and being perpendicular to the plane defined by the front-rear direction and the up-down direction in FIG. 15) is located on a side of the rolling mechanism 21 proximate to the first end of the lifting mechanism 22 (i.e., the rolling mechanism 21 wrapping the optical curtain 23 in a manner of the first surface 23A of the optical curtain 23 towards the rolling mechanism 21 and the second surface 23B away from the rolling mechanism 21), the guide roller 27 presses the second surface 23B of the optical curtain 23. In this way, since a first side of the optical curtain 23 proximate to the rolling mechanism 21 (referring to the lower side in FIG. 15) is fixedly connected to the rolling mechanism 21, and a second side of the optical curtain 23 away from the rolling mechanism 21 (referring to the upper side in FIG. 14) is fixedly connected to the second end of the lifting mechanism 22, with respect to the vertical direction, the optical curtain 23 is inclined toward the lifting mechanism 22 (referring to a direction from the front and the top to the rear and the bottom in FIG. 14). The guide roller 27 located on a side of the second surface 23B of the optical curtain 23 may press and push the optical curtain 23, so that the optical curtain 23 is away from the lifting mechanism 22 in a direction pushed by the guide roller 27, and as a result, the pitch angle of the optical curtain 23 may be corrected.

It will be noted that, the intersection line refers to a line formed, in the axial direction of the rolling mechanism 21, by the optical curtain 23 wrapped on the rolling mechanism 21 at a position where the optical curtain 23 is about to leave the rolling mechanism 21, that is, a line in the axial direction of the rolling mechanism 21 where an unfolded portion of the optical curtain 23 is tangent to the rolling mechanism 21.

In a case where the lifting mechanism 22 is provided with the beam 223, the second side away from the rolling mechanism 21 of the optical curtain 23 may be fixedly connected to the first side 2231 extending in a length direction of the beam 223 (referring to the left-right direction in FIG. 8).

It will be noted that, an included angle between the beam 223 and the horizontal direction will change due to a pulling force of the optical curtain 23, that is, in the vertical direction, a relative position of the first side 2231 and the second side 2232 of the beam 223 will change due to the pulling force of the optical curtain 23. Therefore, a positional relationship among the intersection line, the first end of the lifting mechanism 22 and the second end of the lifting mechanism 22 is changed due to a change of the beam 223, so that the beam 223 affects an arrangement of the guide roller 27 to a certain extent.

For example, as shown in FIG. 14, an angle at which the first side 2231 of the beam 223 tilts downward is y. In this case, compared to a horizontal position of the beam 223 (referring to the front-rear direction in FIG. 14), a pulling force of the rolling mechanism 21 on the optical curtain 23 is greater. The rolling mechanism 21 tilts the first side 2231 of the beam 223 downward by pulling the optical curtain 23, so as to make the optical curtain 23 tilt forward. The intersection line moves upward along a surface of the rolling mechanism 21, the first end of the lifting mechanism 22 moves backward, and the second end of the lifting mechanism 22 moves forward. Therefore, the positional relationship among the intersection line, the first end of the lifting mechanism 22 and the second end of the lifting mechanism 22 changes due to downward inclination of the first side 2231 of the beam 223.

Similarly, in a case where the second side 2232 of the beam 223 is tilted downward, compared to the horizontal position of the beam 223, the pulling force of the tensioning mechanism 24 on the second side 2232 of the beam 223 is greater, so that the optical curtain 23 tilts backward. The intersection line moves downward along the surface of the rolling mechanism 21, the first end of the lifting mechanism 22 moves forward, and the second end of the lifting mechanism 22 moves backward. Therefore, the positional relationship among the intersection line, the first end of the lifting mechanism 22 and the second end of the lifting mechanism 22 changes due to downward inclination of the second side 2232 of the beam 223.

In some embodiments, in a case where the intersection line is located, in the horizontal direction, at a side of the rolling mechanism 21 away from the first end of the lifting mechanism 22, the guide roller 27 presses the first surface 23A of the optical curtain 23. In this way, the first side of the optical curtain 23 is tilted away from the lifting mechanism 22 with respect to the vertical direction. The guide roller 27 located at the first surface 23A of the optical curtain 23 may press and push the optical curtain 23 proximate to the lifting mechanism 22, so that a correction of the pitch angle of the optical curtain 23 may be achieved.

It will be noted that, the guide roller 27 corrects the pitch angle of a portion of the optical curtain 23 in a region between the guide roller 27 and the second end of the lifting mechanism 22. Therefore, the guide roller 27 is disposed proximate to the rolling mechanism 21, so as to ensure a large area adjustment of the optical curtain 23.

In some embodiments, the guide roller 27 includes two sub-guide rollers, the two sub-guide rollers are arranged at an interval, so as to form a gap between the two sub-guide rollers for the optical curtain 23 to pass through. Both ends of each sub-guide roller are fixedly connected to the side walls 251 of the base 25. In this way, in the horizontal direction, no matter the intersection line is located at the side of the rolling mechanism 21 proximate to the first end of the lifting mechanism 22 or the intersection line is located at the side of the rolling mechanism 21 away from the first end of the lifting mechanism 22, either of the two sub-guide rollers may press and push the optical curtain 23, so that the correction of the pitch angle of the optical curtain 23 may be achieved.

Figure 20:
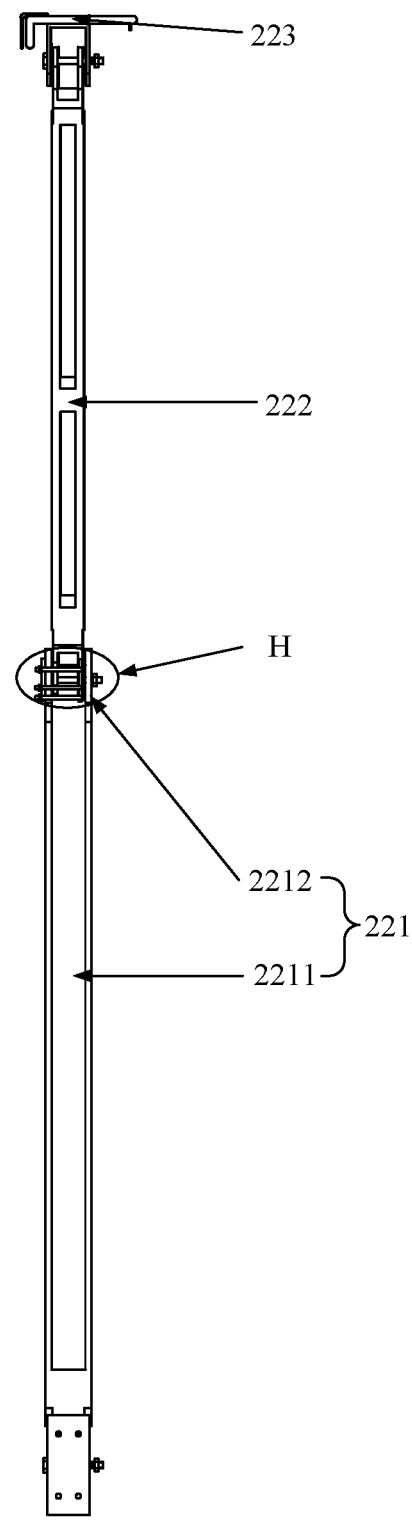
FIG. 20 is a diagram showing a structure of another lifting mechanism, in accordance with some embodiments.
Figure 21:
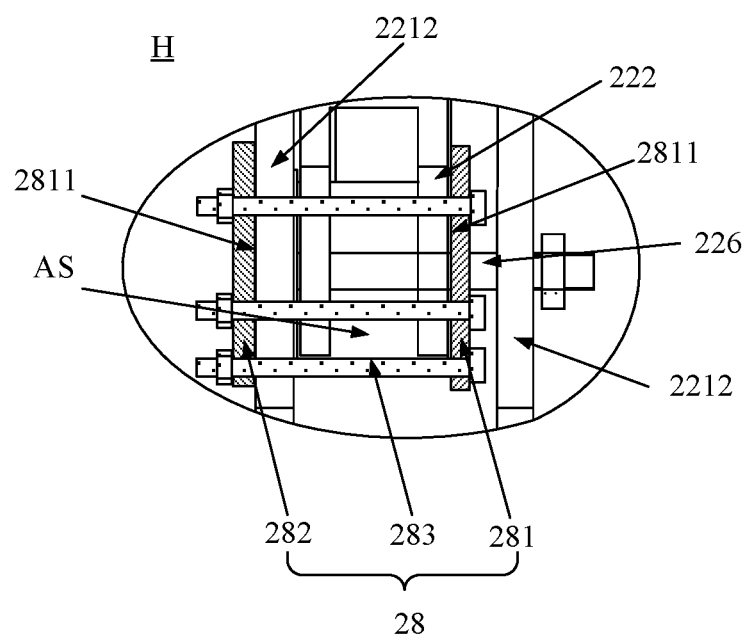
FIG. 21 is a partial enlarged view of circle H in FIG. 20.

FIG. 20 is a diagram showing a structure of another lifting mechanism, in accordance with some embodiments. FIG. 21 is a partial enlarged view of circle H in FIG. 20.

In some embodiments, as shown in FIGS. 20 and 21, the first supporting rod 221 includes a rod body 2211 and two first connecting plates 2212. A first end of the rod body 2211 is rotatably connected to the base 25, and the two first connecting plates 2212 are oppositely arranged at an end of a second end of the rod body 2211, so as to provide the first connecting groove 2213.

The two first connecting plates 2212 may be arranged opposite to each other and are fixedly connected to side walls of the rod body 2211. The two first connecting plates 2212 may be welded to the rod body 2211; of course, the two first connecting plates 2212 and the rod body 2211 may also be integrally formed with the rod body 2211, and the present disclosure is not limited thereto.

In some embodiments, as shown in FIGS. 20 and 21, the projection screen 2 further includes a first adjustment mechanism 28. The first adjustment mechanism 28 is connected to the second end of the first supporting rod 221 and the first end of the second supporting rod 222. The first adjustment mechanism 28 is configured to adjust a relative position between the second end of the first supporting rod 221 and the first end of the second supporting rod 222.

In this way, in a case where the optical curtain 23 is in the unfolded state, the relative position between the second end of the first supporting rod 221 and the first end of the second supporting rod 222 may be adjusted through the first adjustment mechanism 28, so that an inclination angle of the second supporting rod 222 may be adjusted. Since the second end of the second supporting rod 222 is connected to the optical curtain 23 through the beam 223, the pitch angle of the optical curtain 23 may be further adjusted.

In some embodiments, as shown in FIGS. 20 and 21, the first adjustment mechanism 28 includes a first limit plate 281, a second limit plate 282, and an adjustment bolt 283. The first limit plate 281 and the second limit plate 282 are arranged oppositely in the vertical direction, so as to define an assembly space AS between the first limit plate 281 and the second limit plate 282. At least a part of the second end of the first supporting rod 221 and at least a part of the first end of the second supporting rod 222 are located in the assembly space AS. The adjustment bolt 283 is connected to the first limit plate 281 and the second limit plate 282, and is configured to adjust a distance between the first limit plate 281 and the second limit plate 282.

In this way, in a case where the second supporting rod 222 tilts, the distance between the first limit plate 281 and the second limit plate 282 may be reduced through the adjustment bolt 283, so as to adjust the relative position between the second end of the first supporting rod 221 and the first end of the second supporting rod 222.

In some embodiments, the first adjustment mechanism 28 includes a plurality of adjustment bolts 283. The first limit plate 281 may be kept parallel to the second limit plate 282 through the plurality of adjustment bolts 283, so as to ensure the adjustment accuracy of the inclination angle of the second supporting rod 222.

For example, three adjustment bolts 283 are connected to the first limit plate 281 and the second limit plate 282, and the three adjustment bolts 283 are arranged in a triangle manner.

Since the first supporting rod 221 and the second supporting rod 222 rotate relatively in a case where the optical curtain 23 is wrapped, in order to avoid interference of the plurality of adjustment bolts 283, the plurality of adjustment bolts 283 may be connected to an outside OS (as shown in FIG. 10) of a corner formed by the first supporting rod 221 and the second supporting rod 222.

In addition, as shown in FIG. 21, in a case where the relative position between the second end of the first supporting rod 221 and the first end of the second supporting rod 222 are adjusted through the first limit plate 281 and the second limit plate 282, in order to facilitate subsequent relative rotation between the first supporting rod 221 and the second supporting rod 222, the first limit plate 281 and the second limit plate 282 are provided with a second lubricating coating 2811 on two opposite surfaces. The second lubricating coating 2811 may reduce a friction between the first supporting rod 221 and the second limit plate 282, and a friction between the second supporting rod 222 and the first limit plate 281 in a case where the first supporting rod 221 and the second supporting rod 222 rotate with respect to each other.

Figure 22:
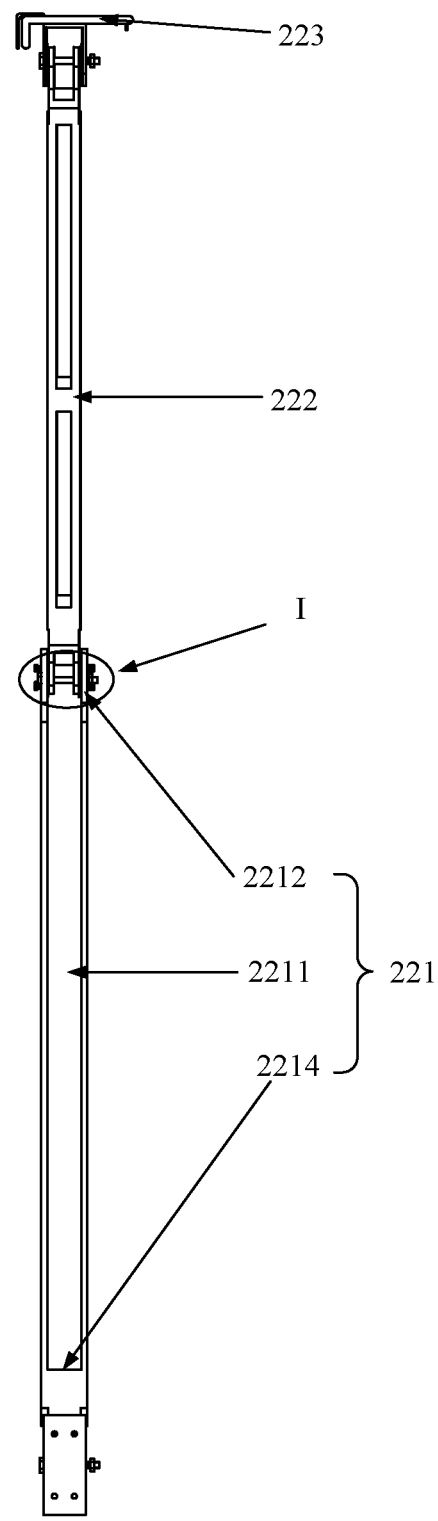
FIG. 22 is a diagram showing a structure of yet another lifting mechanism, in accordance with some embodiments.
Figure 23:
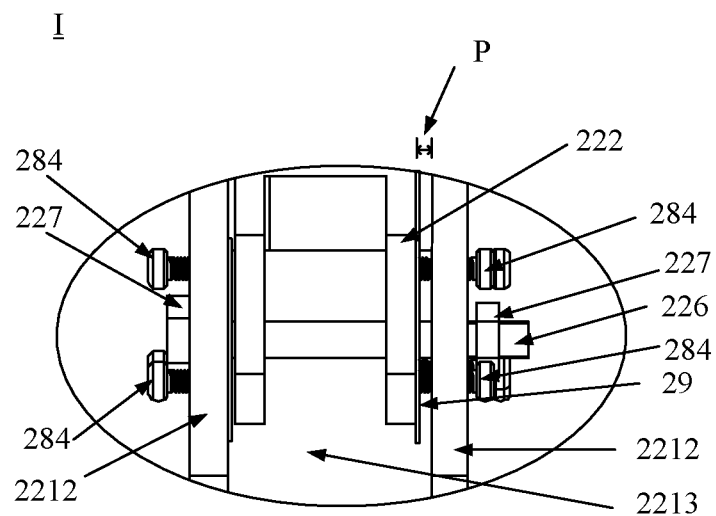
FIG. 23 is a partial enlarged view of circle I in FIG. 22.

FIG. 22 is a diagram showing a structure of another lifting mechanism, in accordance with some embodiments. FIG. 23 is a partial enlarged view of circle I in FIG. 22.

In some embodiments, as shown in FIGS. 22 and 23, the first adjustment mechanism 28 includes an adjustment screw 284. For example, an end of the adjustment screw 284 passes through the first supporting rod 221 and abuts against a side wall of the second supporting rod 222 proximate to the first supporting rod 221. In this way, in a case where the second supporting rod 222 is tilted, an abutting force on the first end of the second supporting rod 222 may be adjusted through the adjustment screw 284, so as to adjust the relative position between the second end of the first supporting rod 221 and the first end of the second supporting rod 222, thus, the adjustment of the inclination angle of the second supporting rod 222 is achieved.

In a case where the first adjustment mechanism 28 includes the adjustment screw 284, an end of the adjustment screw 284 passes through an outer wall of the first supporting rod 221 and is screwed into the first connecting groove 2213, and abuts on an outer wall of the second supporting rod 222.

As shown in FIG. 22, a shape of a groove bottom surface 2214 of the first connecting groove 2213 may be set according to a shape of the first supporting rod 221. For example, in a case where a cross-section of the first supporting rod 221 is in a shape of a square, the groove bottom surface 2214 of the first connecting groove 2213 is also in a shape of a square. In a case where the cross-section of the first supporting rod 221 is in a shape of a circle, the groove bottom surface 2214 of the first connecting groove 2213 is also in a shape of a circle.

As shown in FIG. 23, a fixing nut 227 is provided at each end of the first connecting shaft 226, and each fixing nut 227 is tightened and pressed on a side wall of the first supporting rod 221. In this way, the first connecting shaft 226 is fixedly connected to the first supporting rod 221. In a case where the second supporting rod 222 rotates around the first connecting shaft 226, an included angle between the second supporting rod 222 and the first supporting rod 221 may be changed, so that unfolding and folding of the lifting mechanism 22 may be achieved.

Any one of the two first connecting plates 2212 corresponds to one adjustment screw 284, and the adjustment screw 284 and the first connecting shaft 226 are located at different height. In this way, when the adjustment screw 284 is rotated, the adjustment screw 284 is abutted against the second supporting rod 222 and the second supporting rod 222 is pushed, so as to adjust the inclination angle of the second supporting rod 222, and the adjustment of the relative position between the first end of the second supporting rod 222 and the second end of the first supporting rod 221 is achieved.

Of course, two adjustment screws 284 may also be provided on any one of the first connecting plate 2212. A straight line connected by the two adjustment screws 284 may be in the vertical direction or at an acute angle with the vertical direction, and the present disclosure is not limited thereto.

In actual use, the two adjustment screws 284 may be used together. For example, one adjustment screw 284 located in an upper position is fixed and abutted against the side wall of the second supporting rod 222, and another adjustment screw 284 is rotated so that the second supporting rod 222 is pushed by the adjustment screw 284. In this way, swing of the second supporting rod 222 with respect to a plane perpendicular to a connecting line between the two adjustment screws 284 may be controlled, so that the inclination angle of the second supporting rod 222 may be adjusted to adjust the relative position between the first end of the second supporting rod 222 and the second end of the first supporting rod 221.

For example, as shown in FIG. 10, the plane perpendicular to the connecting line between the two adjustment screws 284 is a plane defined by the left-right direction and the up-down direction. By rotating the another adjustment screw 284, a swing angle of the second supporting rod 222 may be controlled.

Of course, three adjustment screws 284 may also be provided on any one of the first connecting plate 2212, and the three adjustment screws 284 are arranged in a triangle manner. In this way, the three adjustment screws 284 form three constraints on the second supporting rod 222, and the ends of the three adjustment screws 284 are located at a same plane. Therefore, shaking of the second supporting rod 222 may be effectively prevented, and a motion state of the second supporting rod 222 is more stable.

It will be noted that, one adjustment screw 284, two adjustment screws 284 or three adjustment screws 284 may also be provided on each of the first connecting plate 2212. Since the first end of the second supporting rod 222 extends into the first connecting groove 2213 formed by the two first connecting plates 2212, the second supporting rod 222 is pushed, in an opposite direction, by the adjustment screws 284 on the two first connecting plates 2212, so that reciprocating adjustment of the inclination angle of the second supporting rod 222 may be achieved, and in turn, the relative position between the first end of the second supporting rod 222 and the second end of the first supporting rod 221 may be adjusted.

If the adjustment screw 284 is in direct contact with the side wall of the second supporting rod 222, there may be problems of stress concentration and uneven stress. To solve the above problems, in some embodiments, as shown in FIGS. 22 and 23, the projection screen 2 may further include an adjustment spacer 29. The adjustment spacer 29 is located in the first connecting groove 2213 and slidably sleeved on the first connecting shaft 226. The adjustment spacer 29 is disposed between the adjustment screw 284 and a side wall of the second supporting rod 222 proximate to the first connecting plate 2212. In this way, the adjustment screw 284 is directly abutted against the adjustment spacer 29, so as to disperse a force applied by an end of the adjustment screw 284 on the second supporting rod 222 through the adjustment spacer 29, which makes the force on the second supporting rod 222 more uniform.

In some embodiments, the adjustment spacer 29 may have a circular thin sheet structure, a square thin sheet structure, or a triangular thin sheet structure.

It will be noted that, in order to make the adjustment screw 284 disposed at any position of the first connecting plate 2212 abutted against the adjustment spacer 29, a shape of the adjustment spacer 29 may be set to a shape similar to that of the first connecting plate 2212.

As shown in FIG. 23, a thickness of the adjustment spacer 29 may be much less than a width of a gap P, in the axial direction of the first connecting shaft 226, between the second end of the first supporting rod 221 and the first end of the second supporting rod 222, so that the positional relationship between the first supporting rod 221 and the second supporting rod 222 may be freely adjusted through the adjustment screw 284. For example, the thickness of adjustment spacer 29 may be one sixth of the width of the gap P.

The first end of the first supporting rod 221 is rotatably connected to the base 25, and the second end of the second supporting rod 222 is rotatably connected to the beam 223. In order to achieve rotation, the assembly gap will be reserved. If the assembly gap is reserved for rotation, the first supporting rod 221 is tilted with respect to the base 25 and the beam 223 is also tilted with respect to the second supporting rod 222, resulting in tilting of the optical curtain 23.

To solve the above problem, in some embodiments, the projection screen 2 may further include a second adjustment mechanism. The second adjustment mechanism is connected to the first end of the first supporting rod 221 and the base 25 respectively. The second adjustment mechanism is configured to adjust a relative position between the first end of the first supporting rod 221 and the base 25, so as to adjust the inclination angle of the first supporting rod 221.

It will be noted that, a structure of the second adjustment mechanism is similar to the structure of the first adjustment mechanism 28, and will not be repeated herein.

In some embodiments, the lifting mechanism 22 further includes a second connecting shaft. The base 25 has a second connecting groove, the first end of the first supporting rod 221 extends into the second connecting groove, and the second connecting shaft passes through the first end of the first supporting rod 221 and groove walls of the second connecting groove. Herein, a connection manner of the second adjustment mechanism between the first end of the first supporting rod 221 and the base 25 is similar to the connection manner of the first adjustment mechanism 28 between the second end of the first supporting rod 221 and the first end of the second supporting rod 222, and a structure of the second connecting groove is similar to the structure of the first connecting groove, and will not be repeated herein.

In addition, in a case where the second adjustment mechanism includes an adjustment screw, the adjustment spacer 29 may also be provided in the second connecting groove. A structure, a setting position and function of the adjustment spacer 29 are same as the above, and will not be repeated herein.

In some embodiments, the projection screen 2 further includes a third adjustment mechanism. The third adjustment mechanism is connected to the second end of the second supporting rod 222 and the beam 223. The third adjustment mechanism is configured to adjust a relative position between the second end of the second supporting rod 222 and the beam 223, so as to adjust an inclination angle of the beam 223.

A structure of the third adjustment mechanism is similar to the structure of the first adjustment mechanism 28, and will not be repeated herein.

In some embodiments, the lifting mechanism 22 further includes a third connecting shaft. The beam 223 has a third connecting groove. The second end of the second supporting rod 222 extends into the third connecting groove, and the third connecting shaft passes through the second end of the second supporting rod 222 and groove walls of the third connecting groove.

A connection manner of the third adjustment mechanism between the second end of the second supporting rod 222 and the beam 223 is similar to the connection manner of the first adjustment mechanism 28 between the second end of the first supporting rod 221 and the first end of the second supporting rod 222, and a structure of the third connecting groove is similar to the structure of the first connecting groove, and will not be repeated here.

In addition, in a case where the third adjustment mechanism includes the adjustment screw, an adjustment spacer 29 is also provided in the third connecting groove, and the adjustment spacer 29 is slidably sleeved on the third connecting shaft. The adjustment spacer 29 is clamped between an end of the adjustment screw 284 and the side wall of the second supporting rod 222. A structure, a setting position and function of the adjustment spacer 29 are the same as the above, and will not be repeated herein.

In some embodiments, the optical curtain 23 further includes a protective coating. The protective coating is provided on a back surface of the optical curtain 23, that is, the second surface 23B of the optical curtain 23 proximate to the lifting mechanism 22. In this way, in a case where the optical curtain 23 is in a wrapped state, the back surface of the optical curtain 23 provided with the protective coating is in direct contact with a front surface of the optical curtain 23, wear of the optical curtain 23 caused by mutual friction between the back surface and the front surface of the optical curtain 23 may be slowed down through the protective coating, which is conducive to prolonging the service life of the optical curtain 23.

The protective coating may be a coating composed of flexible particles or a colloidal coating. For example, the protective coating may be a nano material coating. The nano material coating has good toughness, impact resistance and thermal stability. After the protective coating is in contact with the optical curtain 23, the protective coating may also improve flatness, wind resistance and stability of the optical curtain 23, and prolong the service life of the optical curtain 23.

Figure 24:
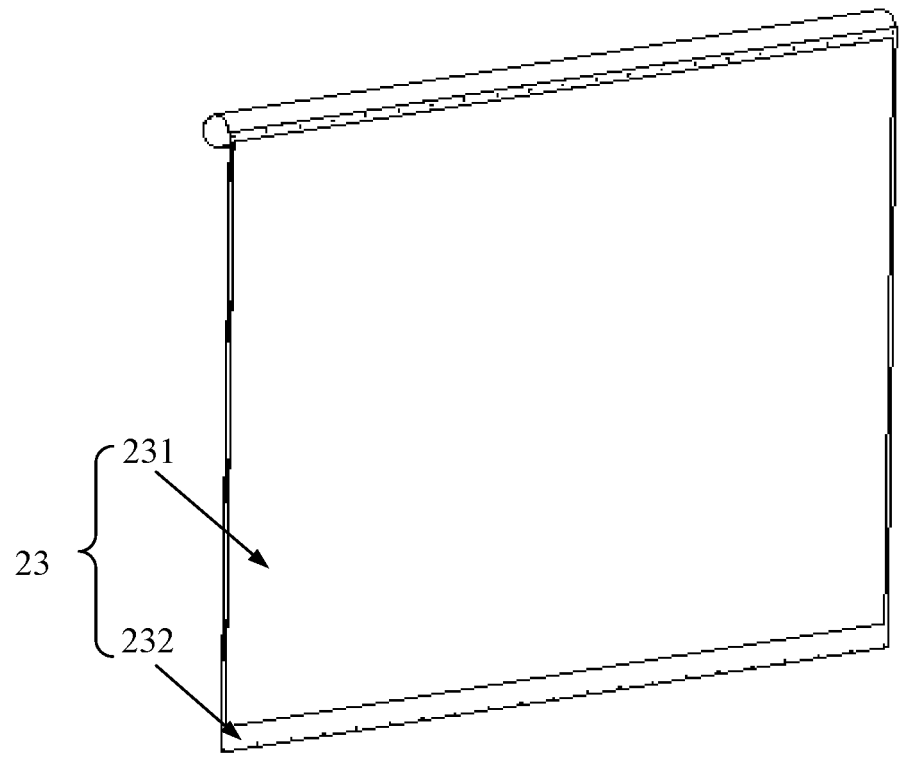
FIG. 24 is a diagram showing a structure of an optical curtain, in accordance with some embodiments.
Figure 25:
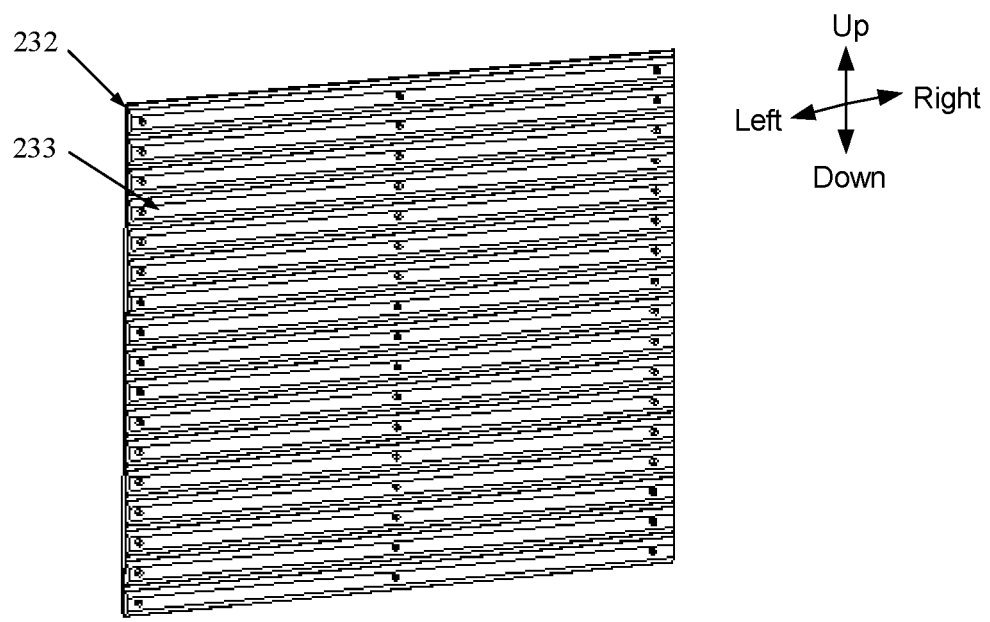
FIG. 25 is a diagram showing a structure of a curlable substrate, in accordance with some embodiments.

FIG. 24 is a diagram showing a structure of an optical curtain, in accordance with some embodiments. FIG. 25 is a diagram showing a structure of a curlable substrate, in accordance with some embodiments.

In some embodiments, as shown in FIG. 24, the optical curtain 23 includes an optical film 231 and a curlable substrate 232. The optical film 231 is covered on the curlable substrate 232 by bonding. As shown in FIG. 25, one or more stiffeners 233 are provided on a side of the curlable substrate 232 away from the optical film 231, and a length direction of each stiffener 233 is not parallel to a longitudinal direction of the curlable substrate 232.

Herein, the length direction of the stiffener 233 may refer to the left-right direction shown in FIG. 25, and the longitudinal direction of the curlable substrate 232 may refer to the up-down direction shown in FIG. 25.

The curlable substrate 232 is fixedly connected to the rolling mechanism 21. The rolling mechanism 21 may wrap the curlable substrate 232 on the rolling mechanism 21. The curlable substrate 232 is also fixedly connected to the second end of the lifting mechanism 22. The lifting mechanism 22 may control the unfolding of the curlable substrate 232. In a case where the curlable substrate 232 is unfolded, the curlable substrate 232 supports the optical film 231 in a flat state. The optical film 231 is configured to reflect the light beams emitted by the optical engine 1 to display an image.

In this way, strength of the curlable substrate 232 may be improved through the stiffener 233, so as to facilitate wrapping of the curlable substrate 232, and make a force on the curlable substrate 232 to be uniform in a transverse direction (referring to the left-right direction in FIG. 25) in a case where the curlable substrate 232 is in the flat state. Since the optical film 231 is bonded to the curlable substrate 232, the optical film 231 is not easy to be wrinkled and deformed, so that the display effect of the optical film 231 may be improved.

Figure 26:
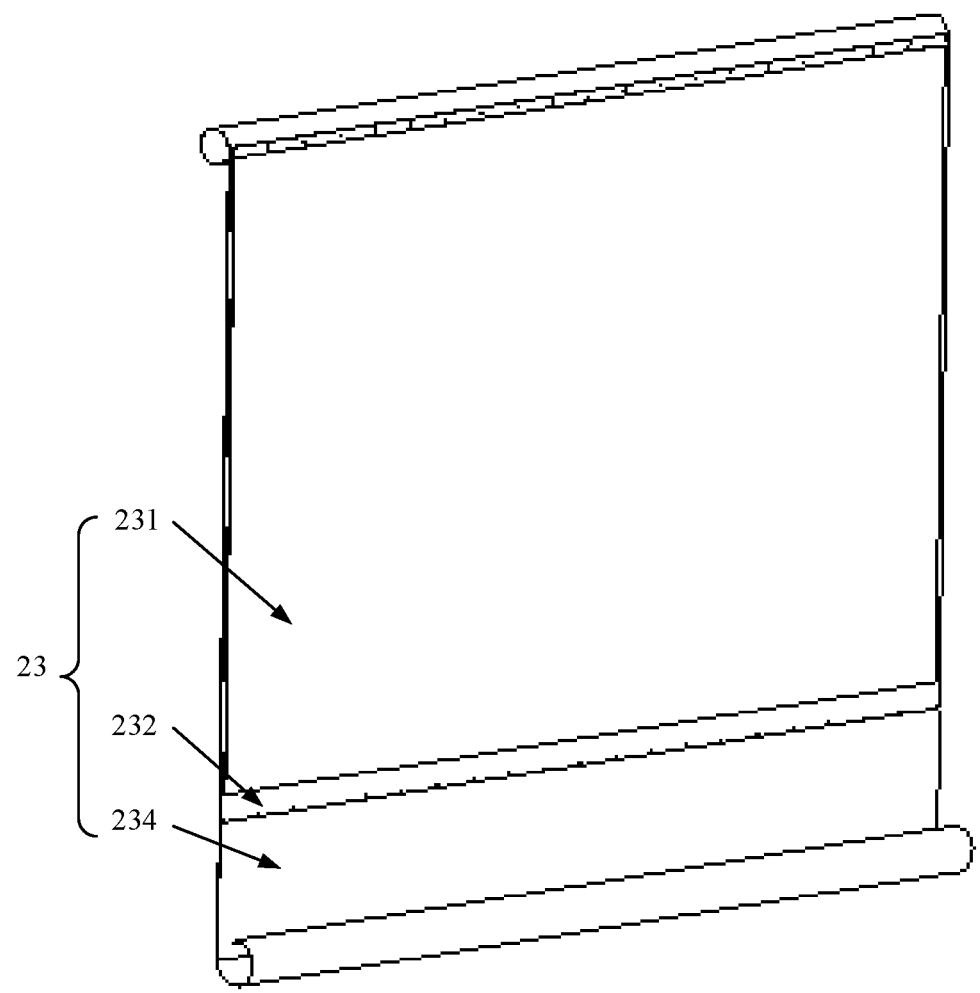
FIG. 26 is a diagram showing a structure of another optical curtain, in accordance with some embodiments.

FIG. 26 is a diagram showing a structure of another optical curtain, in accordance with some embodiments.

In some embodiments, the optical curtain 23 includes an optical film 231 and a flexible carrier 234. The optical film 231 is bonded to the flexible carrier 234, and the flexible carrier 234 is fixedly connected to the rolling mechanism 21. The rolling mechanism 21 may control the flexible carrier 234 to wrap on the rolling mechanism 21. The second end of the lifting mechanism 22 is further fixedly connected to the flexible carrier 234. The lifting mechanism 22 is capable of tensioning and unfolding the flexible carrier 234. In a case where the flexible carrier 234 is unfolded, the flexible carrier 234 supports the optical film 231 in the flat state.

In this way, while the lifting mechanism 22 indirectly tensions the optical film 231 through the flexible carrier 234, the flexible carrier 234 may bear a part of the tensioning force of the lifting mechanism 22 and the optical film 231 is not easy to be damaged, so as to ensure the flatness of the optical film 231.

The flexible carrier 234 may be a carrier such as a synthetic cloth or a film, which is convenient to be wrapped and has strength for bearing objects. In a case where the flexible carrier 234 includes the synthetic cloth, a material of the flexible carrier 234 may be a synthetic material containing nylon. Since the nylon material has advantages of high mechanical strength, good toughness, high tensile strength and compressive strength, the flexible carrier 234 is not easy to deform when tensioned by the lifting mechanism 22, and a surface of the flexible carrier 234 is flat. It is possible to improve the flatness of the optical film 231. Of course, a material of the flexible carrier 234 may also be other materials, and the present disclosure is not limited thereto.

The optical film 231 and the flexible carrier 234 may be bonded by a double-sided adhesive or an adhesive film.

In some embodiments, as shown in FIG. 26, the optical curtain 23 includes an optical film 231, a curlable substrate 232 and a flexible carrier 234. A surface of the curlable substrate 232 is provided with the optical film 231, and another surface of the curlable substrate 232 away from the optical film 231 is provided with the flexible carrier 234. For example, the optical film 231 is bonded to the surface of the curlable substrate 232, and the flexible carrier 234 is bonded to the another surface of the curlable substrate 232. The flexible carrier 234 is fixedly connected to the rolling mechanism 21. The rolling mechanism 21 may control the flexible carrier 234 to wrap on the rolling mechanism 21. The flexible carrier 234 is further fixedly connected to the second end of the lifting mechanism 22, and the lifting mechanism 22 may control the unfolding of the flexible carrier 234. In a case where the flexible carrier 234 is unfolded, the flexible carrier 234 supports the curlable substrate 232 in a flat state.

Figure 27:
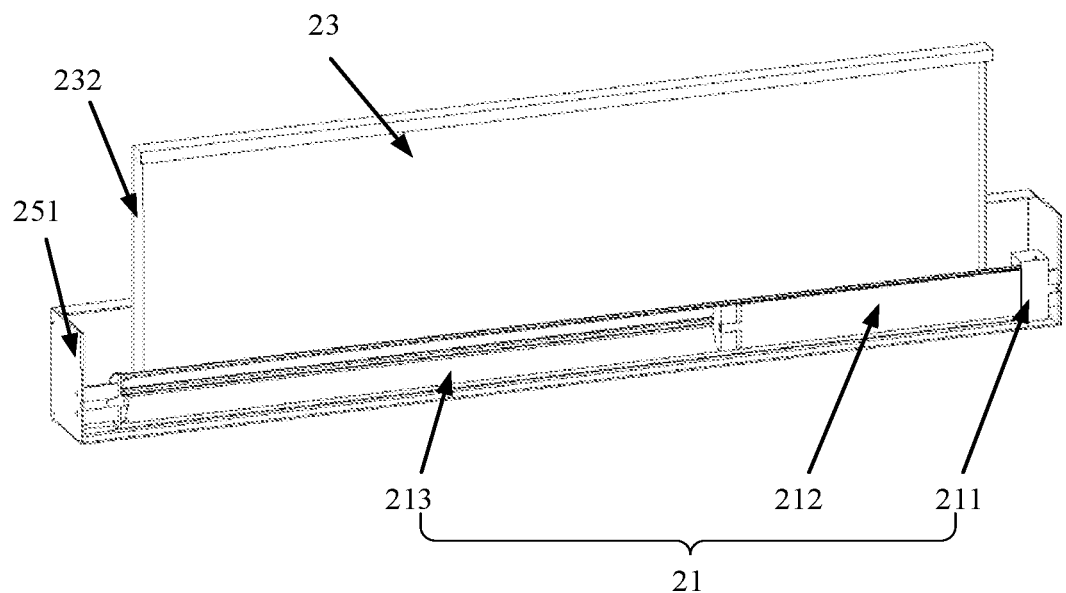
FIG. 27 is a diagram showing a structure of a rolling mechanism, in accordance with some embodiments.

FIG. 27 is a diagram showing a structure of a rolling mechanism, in accordance with some embodiments.

In some embodiments, as shown in FIG. 27, the rolling mechanism 21 includes a rolling controller 211, a rolling motor 212, and a reel 213. The rolling controller 211 is electrically connected to the rolling motor 212. The rolling motor 212 may be fixed on the base 25, and an output shaft of the rolling motor 212 is fixedly connected to an end of the reel 213. The optical curtain 23 is fixedly connected to the reel 213. The rolling controller 211 may control the start and stop of the rolling motor 212, and the rolling motor 212 may drive the reel 213 to rotate after being started. In this way, when the reel 213 is rotated by the rolling controller 211, the optical curtain 23 may be controlled to wrap on the reel 213.

The rolling controller 211 may be a single chip microcomputer, a programmable logic controller (PLC), a programmable auto controller (PAC), or a remote terminal unit (RTU). The remote terminal unit may be, for example, a computer, a mobile phone, or a tablet computer.

Figure 28:
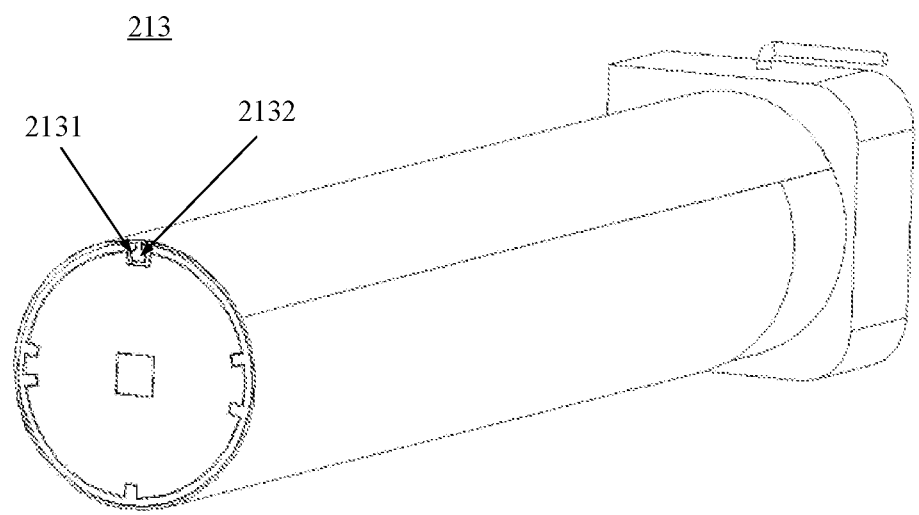
FIG. 28 is a diagram showing a structure of a reel, in accordance with some embodiments.

FIG. 28 is a diagram showing a structure of a reel, in accordance with some embodiments.

As shown in FIG. 28, in a case where the optical curtain 23 is fixed to the reel 213, an outer wall of the reel 213 is provided with a clamping groove 2131 extending in an axial direction of the reel 213. The first side of the optical curtain 23 is provided with a clamping strip 2132 matched with the clamping groove 2131. The clamping strip 2132 may be limited in the clamping groove 2131 in a radial direction of the reel 213, so that limit of the optical curtain 23 in a circumferential direction of the reel 213 may be achieved.

In this way, when the reel 213 rotates, wrapping of the optical curtain 23 and rotating of the reel 213 may be achieved synchronously through the cooperation between the clamping strip 2132 and the clamping groove 2131, so that the optical curtain 23 may be wrapped on the reel 213. Moreover, due to the limit of the clamping strip 2132, the reel 213 may provide a certain tension on the first side of the optical curtain 23. The tension may cooperate with a force of unfolding the optical curtain 23 provided by the lifting mechanism 22, so as to make the optical curtain 23 flat, and improve the display effect of the optical curtain 23.

It will be noted that, in a case where the tensioning mechanism 24 includes the tensioning assembly 242 and the tensioning assembly 242 includes the cloth 2421, a connection manner between the cloth 2421 and the rolling mechanism 21 is similar to the connection manner between the optical curtain 23 and the rolling mechanism 21, and will not be repeated herein.

Figure 29:
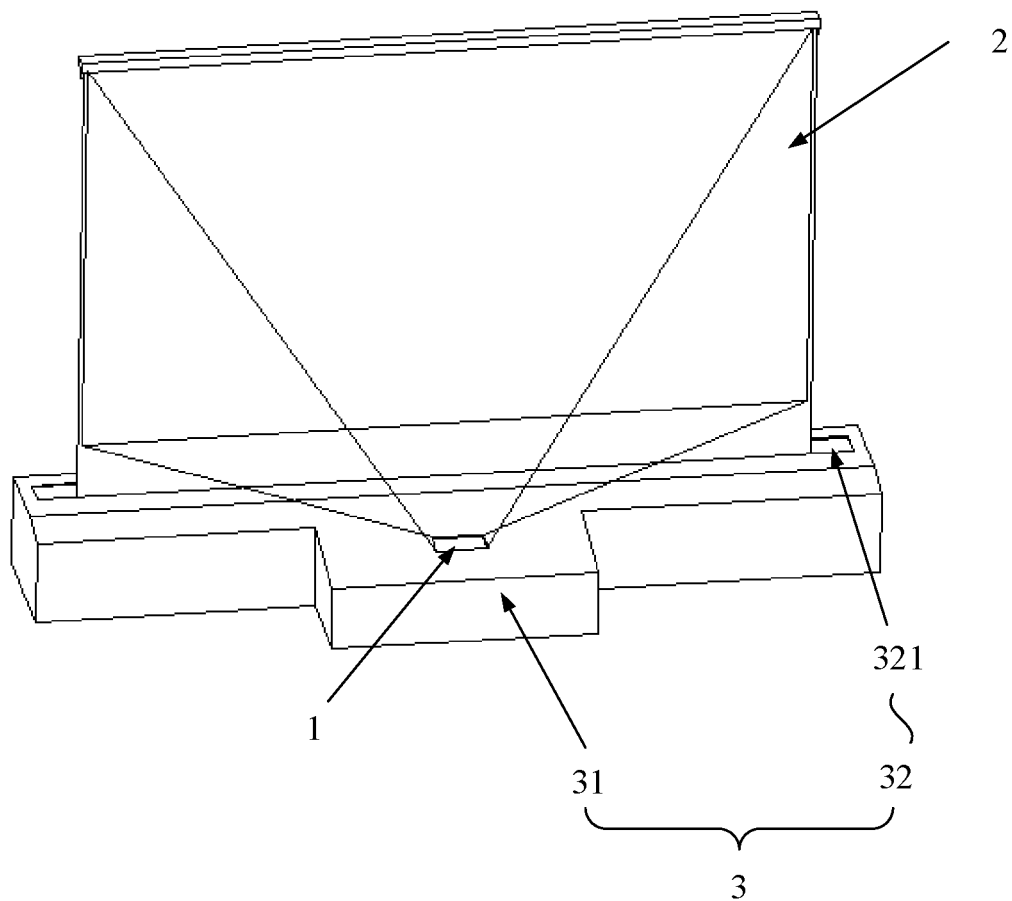
FIG. 29 is a diagram showing a structure of another projection apparatus, in accordance with some embodiments.

FIG. 29 is a diagram showing a structure of another projection apparatus, in accordance with some embodiments.

In some embodiments, as shown in FIG. 29, the projection apparatus 1000 further includes an accommodating base 3. The accommodating base 3 is configured to accommodate the optical engine 1 and the projection screen 2. In this way, in the case where the projection apparatus 1000 is not used, the optical engine 1 and the projection screen 2 may be accommodated in the accommodating base 3 to save space.

In the case where the projection apparatus 1000 is in use, the projection screen 2 may be unfolded, and the optical engine 1 may project light beams onto the projection screen 2, so that the projection screen 2 display an image. In a case where the projection screen 2 is in the unfolded state, there is a fixed preset distance between the optical engine 1 and the projection screen 2. In this way, a preset projection ratio may be maintained.

It will be noted that, all of the rolling mechanism 21, the lifting mechanism 22, the optical curtain 23 and the tensioning mechanism 24, in a case where they are included in the projection screen 2, may be accommodated in the accommodating base 3, and the lifting mechanism 22, the optical curtain 23 and the tensioning mechanism 24 may also be unfolded simultaneously.

In some embodiments, as shown in FIG. 29, the accommodating base 3 includes a first accommodating portion 31 and a second accommodating portion 32.

The optical engine 1 is disposed in an inner cavity of the first accommodating portion 31. The first accommodating portion 31 is provided with a light transmitting region, and the light beams emitted by the optical engine 1 may pass through the light transmitting region. The light transmitting region is blocked and is invisible in FIG. 29.

The rolling mechanism 21 and the lifting mechanism 22 are disposed in an inner cavity of the second accommodating portion 32. The rolling mechanism 21 may control the optical curtain 23 and the tensioning mechanism 24 to be accommodated in the inner cavity of the second accommodating portion 32. The second accommodating portion 32 is provided with an opening 321, and the lifting mechanism 22 controls the optical curtain 23 and the tensioning mechanism 24 to extend out of the opening and unfold.

It will be noted that, in a case where the tensioning mechanism 24 includes the auxiliary roller 241 and the tensioning assembly 242, the auxiliary roller 241 may be located in or above the accommodating base 3.

Generally, the auxiliary roller 241 is disposed in the accommodating base 3, and a central axis of the auxiliary roller 241 is located in a same horizontal plane as a central axis of the rolling mechanism 21. In this way, in a case where the auxiliary roller 241 is pressed on the tensioning assembly 242, the auxiliary roller 241 is proximate to the first end of the lifting mechanism 22, therefore, it is possible to ensure that a region of the lifting mechanism 22 from a position proximate to the first end of the lifting mechanism 22 to a position proximate to the second end of the lifting mechanism 22 is not easy to contact the tensioning assembly 242, so that a contact area between the tensioning assembly 242 and the lifting mechanism 22 may be significantly reduced. Thus, interference between the lifting mechanism 22 and the tensioning assembly 242 is avoided.

In some embodiments of the present disclosure, in the case where the projection apparatus 1000 is not used, it is possible to fold the optical curtain 23 and the tensioning mechanism 24 by wrapping the rolling mechanism 21, so that the space occupied by the projection screen 2 may be reduced. In the case where the projection apparatus 1000 is used, the optical curtain 23 and the tensioning mechanism 24 are unfolded through the lifting mechanism 22, so that the optical curtain 23 reflects the light beams emitted by the optical engine 1 and displays the image.

In a case where the optical curtain 23 and the tensioning mechanism 24 are in the unfolded state, since the lifting mechanism 22 is located between the optical curtain 23 and the tensioning mechanism 24, the tension of the tensioning mechanism 24 on the second end of the lifting mechanism 22 may be balanced with the tension of the optical curtain 23 on the second end of the lifting mechanism 22. In this way, the tensioning mechanism 24 may limit the pitch angle of the optical curtain 23 and correct the pitch angle of the optical curtain 23. Therefore, the problems of distortion or blur of the image displayed on the optical curtain 23 may be avoided, and the display effect of the projection screen 2 may be improved.

In a case where the tensioning mechanism 24 includes the auxiliary roller 241 and the tensioning assembly 242, the auxiliary roller 241 may be pressed on the tensioning assembly 242, so that the tensioning assembly 242 may be controlled to tension the lifting mechanism 22 to balance the tension of the optical curtain 23 on the lifting mechanism 22.

In a case where the projection screen 2 includes the curlable substrate 232, a support strength of the crimpable substrate 232 is high and a force on the curlable substrate 232 is uniform, so that the optical curtain 23 bonded to the curlable substrate 232 is not easy to be wrinkled and deformed.

In addition, the accommodating base 3 may accommodate the optical engine 1 and the projection screen 2, so that the occupied space of the projection apparatus 1000 may be reduced in the case where the projection apparatus 1000 is not used.

The foregoing descriptions are merely specific implementations of the present disclosure, but the protection scope of the present disclosure is not limited thereto. Any person skilled in the art could conceive of changes or replacements within the technical scope of the present disclosure, which shall be included in the protection scope of the present disclosure. Therefore, the protection scope of the present disclosure shall be subject to the protection scope of the claims.

What is claimed is:

1. A projection screen, comprising:
   a base;
   a rolling mechanism disposed on the base;
   a lifting mechanism, a first end of the lifting mechanism being fixedly connected to the base;
   an optical curtain, a first end of the optical curtain being fixedly connected to the rolling mechanism, and a second end of the optical curtain being fixedly connected to a second end of the lifting mechanism; and
   a tensioning mechanism fixedly connected to the rolling mechanism and the second end of the lifting mechanism; wherein,
   the lifting mechanism is located between the optical curtain and the tensioning mechanism; and
   the tensioning mechanism includes:
      a tensioning assembly, a first end of the tensioning assembly being fixedly connected to the rolling mechanism, and a second end of the tensioning mechanism being fixedly connected to the second end of the lifting mechanism; and
      an auxiliary roller, each end of the auxiliary roller being connected to a side wall of the base, and the auxiliary roller being configured to press the tensioning assembly; wherein
      the end of the auxiliary roller is movably connected to the side wall of the base;
      the side wall of the base is provided with a guide groove, and the end of the auxiliary roller passes through the guide groove and is movable in a length direction of the guide groove; and
      the length direction is a direction of the tensioning assembly proximate to or away from the optical curtain.

2. The projection screen according to claim 1, wherein the base further includes:
   a lubricating member disposed in the guide groove and fixedly connected to the auxiliary roller, so as to reduce a friction between the auxiliary roller and the guide groove.

3. The projection screen according to claim 1, further comprising a control mechanism connected to the auxiliary roller, the control mechanism being configured to drive the auxiliary roller to move in the length direction of the guide groove;
   wherein, the control mechanism includes:
      a controlling motor fixedly connected to the base;
      a transmission component connected to an output shaft of the controlling motor;
      an adjustment nut, an end of the adjustment nut away from the auxiliary roller being threadedly connected to the transmission component, another end of the adjustment nut proximate to the auxiliary roller being fixedly connected to the auxiliary roll; and
      an adjustment controller electrically connected to the controlling motor to control a start and stop of the controlling motor.

4. The projection screen according to claim 3, wherein the transmission component includes:
   a first gear, the controlling motor being coaxially connected to the first gear, so as to drive the first gear to rotate;
   a second gear engaging with the first gear; and
   a lead screw, an end of the lead screw being connected to the second gear, and another end of the lead screw being threadly connected to the adjustment nut.

5. The projection screen according to claim 1, wherein the auxiliary roller includes:
   a central shaft, each end of the central shaft being connected to the side wall of the base; and
   a drum rotatably sleeved on an outside of the central shaft, and the drum pressing on the tensioning assembly.

6. The projection screen according to claim 1, wherein the auxiliary roller further includes:
   a first lubricating coating disposed on an outer surface of the auxiliary roller, so as to reduce a friction between the auxiliary roller and the tensioning assembly.

7. The projection screen according to claim 1, wherein the tensioning assembly includes at least one of a cloth or a rope.

8. The projection screen according to claim 1, wherein the lifting mechanism includes:
   a beam, the second end of the optical curtain being fixedly connected to the beam.

9. The projection screen according to claim 8, wherein
   the lifting mechanism further includes a first supporting rod and a second supporting rod;
   a first end of the first supporting rod is rotatably connected to the base, a second end of the first supporting rod is rotatably connected to a first end of the second supporting rod, and a second end of the second supporting rod is rotatably connected to the beam.

10. The projection screen according to claim 9, wherein the lifting mechanism further includes:
    a lifting motor, the lifting motor being fixed on the base, an output shaft of the lifting motor being connected to the first end of the first supporting rod; and
    a lifting controller electrically connected to the lifting motor to control a start and stop of the lifting motor.

11. The projection screen according to claim 1, wherein the optical curtain satisfies one of the following:
    the optical curtain includes:
       an optical film;
       a curlable substrate, a surface of the curlable substrate being provided with the optical film; and
       a stiffener disposed on another surface of the curlable substrate away from the optical film;
    or
    the optical curtain includes:
       an optical film;
       a curlable substrate, the surface of the curlable substrate being provided with the optical film; and
       a flexible carrier disposed on the another surface of the curlable substrate away from the optical film.

12. The projection screen according to claim 1, wherein the rolling mechanism includes:
   a rolling motor fixedly connected to the base;
   a reel, an output shaft of the rolling motor being fixedly connected to an end of the reel, the first end of the optical curtain being fixedly connected to the reel; and
   a rolling controller electrically connected to the rolling motor to control a start and stop of the rolling motor.

13. A projection apparatus, comprising:
   the projection screen according to claim 1 configured to display a projection image; and
   an optical engine configured to emit light beams to the projection screen.

14. The projection apparatus according to claim 13, further comprising an accommodating base, wherein the accommodating base includes:
   a first accommodating portion, the optical engine being disposed in an inner cavity of the first accommodating portion; and
   a second accommodating portion, the rolling mechanism and the lifting mechanism being disposed in an inner cavity of the second accommodating portion, and the rolling mechanism controlling the optical curtain and the tensioning mechanism to be accommodated in the inner cavity of the second accommodating portion.

15. A projection screen, comprising:
   a base;
   a rolling mechanism disposed on the base;
   a lifting mechanism, a first end of the lifting mechanism being fixedly connected to the base;
   an optical curtain, a first end of the optical curtain being fixedly connected to the rolling mechanism, and a second end of the optical curtain being fixedly connected to a second end of the lifting mechanism; and
   a guide roller disposed at a position where the second end of the lifting mechanism is proximate to the rolling mechanism, each end of the guide roller being connected to a side wall of the base, and the guide roller being configured to press the optical curtain, so as to limit a pitch angle of the optical curtain; wherein
   the rolling mechanism is located at a side of the lifting mechanism proximate to the optical curtain; and
   the optical curtain includes:
   an optical film;
   a curlable substrate, a surface of the curlable substrate being provided with the optical film; and
   a stiffener disposed on another surface of the curlable substrate away from the optical film, a length direction of the stiffener being not parallel to a longitudinal direction of the curlable substrate, and the length direction being a direction from the first end of the optical curtain to the second end of the optical curtain.

* * * * *